United States Patent
Kobayashi et al.

(10) Patent No.: US 7,960,464 B2
(45) Date of Patent: *Jun. 14, 2011

(54) THERMOPLASTIC RESIN COMPOSITION AND MOLDED ARTICLE

(75) Inventors: Sadayuki Kobayashi, Nagoya (JP); Shinichiro Ochiai, Nagoya (JP); Akiko Tanaka, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 336 days.

This patent is subject to a terminal disclaimer.

(21) Appl. No.: 12/153,525

(22) Filed: May 20, 2008

(65) Prior Publication Data

US 2008/0226857 A1    Sep. 18, 2008

Related U.S. Application Data

(62) Division of application No. 11/020,564, filed on Dec. 27, 2004, now Pat. No. 7,385,013.

(30) Foreign Application Priority Data

| May 12, 2004 | (JP) | 2004-142951 |
| May 28, 2004 | (JP) | 2004-160350 |
| May 28, 2004 | (JP) | 2004-160351 |
| May 28, 2004 | (JP) | 2004-160354 |
| Sep. 3, 2004 | (JP) | 2004-257767 |

(51) Int. Cl.
*C08L 69/00* (2006.01)
*C08L 67/02* (2006.01)

(52) U.S. Cl. ........ 524/425; 524/447; 524/449; 524/451; 524/494; 525/439

(58) Field of Classification Search ........................ None
See application file for complete search history.

(56) References Cited

U.S. PATENT DOCUMENTS

| 5,159,003 A | 10/1992 | Baghaii ........................... 524/288 |
| 5,239,001 A | 8/1993 | Fischer et al. ................. 525/133 |
| 5,401,813 A | 3/1995 | Mason ........................... 525/439 |
| 5,668,215 A | 9/1997 | Chao et al. ..................... 525/67 |
| 2002/0111428 A1 | 8/2002 | Gaggar et al. ................. 525/67 |
| 2004/0210009 A1 | 10/2004 | Kobayashi et al. ........... 525/433 |
| 2004/0266957 A1 | 12/2004 | Kobayashi et al. ........... 525/437 |
| 2005/0085589 A1 | 4/2005 | Kim ................................ 525/67 |

FOREIGN PATENT DOCUMENTS

| EP | 0 427 366 A | 5/1991 |
| EP | 0 653 462 A2 | 5/1995 |
| EP | 0 728 802 A1 | 8/1996 |
| EP | 0 736 558 A2 | 10/1996 |
| GB | 1 459 954 | 12/1976 |
| JP | 5-156141 A | 6/1993 |
| JP | 11-49937 A | 2/1999 |
| JP | 2003-286414 A | 10/2003 |
| JP | 2003-292752 A | 10/2003 |

OTHER PUBLICATIONS

Machine translation of JP2003292752.*
Machine translation of JP11049937.*
Translation of JP2003286414.*

* cited by examiner

*Primary Examiner* — David Buttner
(74) *Attorney, Agent, or Firm* — Kubovcik & Kubovcik

(57) ABSTRACT

The present invention is a polycarbonate resin composition containing a polycarbonate resin and comprising at least two resins contained as components, wherein the intensity ratio of the absorption peak appearing in a range of 2933±5 cm$^{-1}$ to the absorption peak appearing in a range of 2965±5 cm$^{-1}$ is 0.43 or more. The polymer alloy of this invention can be used to obtain a material with excellent impact resistance.

10 Claims, No Drawings

US 7,960,464 B2

THERMOPLASTIC RESIN COMPOSITION AND MOLDED ARTICLE

This application is a division of U.S. patent application Ser. No. 11/020,564 filed Dec. 27, 2004, now U.S. Pat. No. 7,385,013, which claims priority of Japanese patent application Nos. 2004-142951 filed May 12, 2004; 2004-160350 filed May 28, 2004; 2004-160351 filed May 28, 2004; 2004-160354 filed May 28, 2004; and 2004-257767 filed Sep. 3, 2004, each of which is incorporated herein by reference.

BACKGROUND OF THE INVENTION

1. Technical Field

The present invention relates to a polymer alloy containing a polycarbonate resin and comprising at least two resins contained as components, a thermoplastic resin composition containing polybutylene terephthalate resin, a polycarbonate resin and a filler, a transparent molded article containing polybutylene terephthalate resin and a polycarbonate resin, a molded hollow article containing polybutylene terephthalate resin and a polycarbonate resin, and a molded composite article containing polybutylene terephthalate resin and a polycarbonate resin.

2. Background Art

Since a polycarbonate resin is poor in chemicals resistance and flowability, though excellent in impact resistance, polymer alloys consisting of it and any of various other resins have been examined as a means for improving it. However, the manufactured polymer alloys have a problem that the impact resistance as a feature of the polycarbonate is lowered.

JP5-156141A describes a molded article having a network structure in which a polycarbonate resin and a polyalkylene terephthalate resin such as polybutylene terephthalate resin are penetrated into each other as components, obtained by mixing and compounding acrylic graft (co)polymer particles with the polycarbonate resin and the polyalkylene terephthalate resin such as polybutylene terephthalate resin. It is disclosed that this structure improves chemicals resistance, strength and toughness to some extent compared with a simple polymer alloy. However, according to the method described in the document, satisfactory effects could not be achieved in improving the impact resistance or chemicals resistance of the molded article.

JP2003-286414 discloses that if a polycarbonate resin and polybutylene terephthalate resin are spinodal decomposition, a co-continuous structure with a wavelength of concentration fluctuation of 0.001 to 1 μm or a dispersed structure with a distance between particles of 0.001 to 1 μm is formed to improve the mechanical strength. In the method described in the document, shearing in an extruder is used for making the polycarbonate resin and the polybutylene terephthalate resin miscible with each other, and subsequently spinodal decomposition is carried out to control the alloy structure. This method provides an effect of improving mechanical properties, but even if both the resins are merely made miscible with each other, the effect of improving the impact resistance is not satisfactory enough. So, further improvement is desired.

GIST OF THE INVENTION

The problem to be solved by this invention is to provide a polymer alloy containing a polycarbonate resin and having excellent impact resistance.

A first version of this invention is a polymer alloy comprising a polycarbonate resin and comprising at least two resins contained as components, wherein in the case where the infrared absorption spectrum of the polymer alloy is measured, the intensity ratio of the absorption peak appearing in a range of $2933\pm5$ $cm^{-1}$ to the absorption peak appearing in a range of $2965\pm5$ $cm^{-1}$ is 0.43 or more.

A second version of this invention is a thermoplastic resin composition comprising a polymer alloy, in which at least polybutylene terephthalate resin and a polycarbonate resin are mixed, and a filler, wherein said filler is the following inorganic particles (a) and/or glass fibers (b), and said polymer alloy forms a co-continuous structure with a wavelength of concentration fluctuation of 0.001 to 5 μm or a dispersed structure with a distance between particles of 0.001 to 5 μm;
(a) Inorganic particles with a number average particle size of 10 μm or less, as measured by the laser diffraction method;
(b) Glass fibers, not less than 60 wt % of which in the thermoplastic resin composition has their fiber lengths kept in a range from 0.1 to 1 mm.

A third version of this invention is a molded transparent article comprising a polymer alloy, in which at least polybutylene terephthalate resin and a polycarbonate resin are mixed, wherein said polymer alloy forms a co-continuous structure with a wavelength of concentration fluctuation of 0.001 μm to less than 0.4 μm or a dispersed structure with a distance between particles of 0.001 μm to less than 4 μm on the surface of said molded article, and a 3 mm thick specimen obtained from said molded transparent article and heat-treated at 150° C. for 1 hour has a light transmittance of 80% or more in the visible light with a wavelength of 400 μm.

A fourth version of this invention is a molded article with a hollow portion manufactured by molding a polymer alloy, in which at least polybutylene terephthalate resin and a polycarbonate resin are mixed, wherein the polymer alloy constituting said molded article forms a co-continuous structure with a wavelength of concentration fluctuation of 0.001 to 5 μm or a dispersed structure with a distance between particles of 0.001 to 5 μm on the surface of the molded article.

A fifth version of this invention is a molded article with a weld zone in which a molded article manufactured by molding a polymer alloy, in which at least polybutylene terephthalate resin and a polycarbonate resin are mixed, is welded to another member, wherein said polymer alloy forms a co-continuous structure with a wavelength of concentration fluctuation of 0.001 to 5 μm or a dispersed structure with a distance between particles of 0.001 to 5 μm on the surface of the non-weld zone comprising said polymer alloy in said molded article.

DESIRABLE MODES FOR CARRYING OUT THE INVENTION

The first version of this invention is a polymer alloy comprising a polycarbonate resin and comprising at least two resins contained as components, wherein in the case where the infrared absorption spectrum of the polymer alloy is measured, the intensity ratio of the absorption peak appearing in a range of $2933\pm5$ $cm^{-1}$ to the absorption peak appearing in a range of $2965\pm5$ $cm^{-1}$ (hereinafter called the infrared absorption peak intensity ratio) is 0.43 or more.

Infrared absorption peak intensity ratio=$I(2933$ $cm^{-1})/I(2965$ $cm^{-1})$     [Formula 1]

$I(2933$ $cm^{-1})$: Peak intensity of the infrared absorption appearing in a range of $2933\pm5$ $cm^{-1}$ in said composition $I(2965$ $cm^{-1})$: Peak intensity of the infrared absorption appearing in a range of $2965\pm5$ $cm^{-1}$ in said composition Preferred examples of the polycarbonate resin used in the polymer alloy of this invention include those manufactured using one or more dihydroxy compounds selected from bisphenol A, i.e., 2,2'-bis(4-hydroxyphenyl)propane, 4,4'-dihydroxy diphenyl alkane, 4,4'-dihydroxy diphenyl sulfone, and 4,4'-dihydroxy diphenyl ether as main raw materials. Above all, what is manufactured using bisphenol A, i.e., 2,2'-bis(4-hydroxyphenyl)propane as a main raw material is preferred. Particularly a polycarbonate obtained by an ester interchange method or phosgene method using, for example, said bisphenol A as a dihydroxy component is preferred. Furthermore, said bisphenol A can also be used together with another dihydroxy compound copolymerizable with it such as 4,4'-dihydroxy diphenyl alkane, 4,4'-dihydroxy diphenyl sulfone or 4,4'-dihydroxy diphenyl ether. It is preferred that the amount of the other dihydroxy compound used is 10 mol % or less based on the total amount of the dihydroxy compounds.

Moreover, with regard to said polycarbonate resin, in view of excellent impact resistance and molding properties, a suitable polycarbonate resin has a specific viscosity of 0.1 to 2.0, especially 0.5 to 1.5, most preferably 0.8 to 1.5 when a solution with 0.7 g of the polycarbonate resin dissolved in 100 ml of methylene chloride is measured at 20° C.

The polymer alloy of this invention consists of at least two resins contained as components including a polycarbonate resin.

Furthermore, as the polymer alloy of this invention, it is necessary that in the case where the infrared absorption spectrum of said composition is measured, the intensity ratio of the absorption peak appearing in a range of $2933\pm5$ cm$^{-1}$ to the absorption peak appearing in a range of $2965\pm5$ cm$^{-1}$ (infrared absorption peak intensity ratio) is 0.43 or more, preferably 0.45 or more. A more preferred range of the infrared absorption peak intensity ratio is from 0.45 to 0.7, and the most preferred range is from 0.45 to 0.6.

Meanwhile, the peak intensity referred to in the above means a value obtained by subtracting the intensity value on the straight base line corresponding to the peak position from the intensity value at said position. The straight base line means the straight line connecting the intensity at 3200 cm$^{-1}$ with the intensity at 2700 cm$^{-1}$. The infrared absorption spectrum can be measured by infrared absorption ATR measurement. In the above infrared absorption spectrum, the peak appearing near 2933 cm$^{-1}$ is attributable to the combination consisting of C=O and O—C—O, namely, the trans-trans structure for the C=O of the polycarbonate. In said infrared absorption spectrum, the peak appearing near 2965 cm$^{-1}$ is attributable to C—H asymmetric stretching, namely, the cis-trans structure for the C=O of the polycarbonate. That is, said infrared absorption peak intensity ratio expresses the rate of the semi-crystalline phase where the trans-trans structure is dominant, to the amorphous phase where the cis-trans structure is dominant. In this invention, it has been found that when the semi-crystalline phase/amorphous phase ratio of the polycarbonate resin measured by means of the infrared absorption spectrum in the polycarbonate resin composition is in said range, the impact resistance improves dramatically.

In a polymer alloy, the semi-crystalline phase/amorphous phase ratio can be enhanced, for example, by compounding a polycarbonate resin with another resin at a shear stress higher than the ordinary shear stress. In this case, it is preferred that the shear rate at the time of compounding is in a range from 100 to 10000 sec$^{-1}$. Furthermore, from the viewpoint of achieving a larger semi-crystalline phase/amorphous phase ratio, it is especially preferred that said shear rate is in a range from 500 to 5000 sec$^{-1}$, and a more preferred range is from 1000 sec$^{-1}$ to 3000 sec$^{-1}$. In this case, it is preferred that as another resin to be kneaded with the polycarbonate resin, a resin miscible with the polycarbonate resin under shear flow with the shear rate kept in a range from 100 to 10000 sec$^{-1}$ is selected for being kneaded in a miscible state. It is preferred to fix the structure after kneading in a miscible state, since the structure can be fixed without greatly impairing the semi-crystalline phase/amorphous phase ratio formed at a high shear stress. Meanwhile, in this invention, "being miscible with the polycarbonate resin under shear flow with the shear rate kept in a range from 100 to 10000 sec$^{-1}$" does not mean that it is necessary to be miscible with the polycarbonate resin under the shearing condition in the entire shear rate range, but means that it is only necessary to be miscible with the polycarbonate under the shearing condition at any shear rate within the range.

The resin miscible with the polycarbonate resin under shear flow with the shear rate kept in a range from 100 to 10000 sec$^{-1}$ as described above can be a resin miscible with the polycarbonate resin or a resin immiscible under no shear flow but miscible under said shear flow. A resin immiscible under no shear flow but miscible under said shear flow can be more preferably used, since a polymer alloy with the preferred co-continuous structure or dispersed structure described later can be obtained.

Meanwhile, in the case where a parallel disc type shear flow-applying device is used for example, the shear rate in the above can be obtained by placing a molten resin heated to a predetermined temperature between the parallel discs and calculating from $\omega \times r/h$, wherein r is the distance from the center, h is the distance between the parallel discs, and $\omega$ is the angular speed of rotation.

As a particular method for manufacturing the polymer alloy of this invention, if at least two resins contained as components including a polycarbonate resin are compounded in the kneading zones of a two-screw extruder at a sufficiently high shear stress to keep the semi-crystalline phase/amorphous phase ratio in the range specified in this invention, then the polymer alloy can be obtained. In the case where a two-screw extruder is used, the high shear stress state can be formed or adequately adjusted by arranging screws to use many kneading blocks, lowering the resin temperature, raising the screw speed, and raising the viscosities of the polymers used.

A preferred specific viscosity of the polycarbonate resin for forming the high shear stress state is in a range from 0.5 to 1.5. A more preferred range is from 0.8 to 1.5. In this case, the specific viscosity of the polycarbonate resin can be obtained by dissolving 0.7 g of the polycarbonate into 100 ml of methylene chloride, and measuring at 20° C.

Furthermore, in the polymer alloy of this invention, it is preferred that the polycarbonate resin and the resin other than the polycarbonate resin form a co-continuous structure with a wavelength of concentration fluctuation of 0.001 µm to less than 5 µm or a dispersed structure with a distance between particles of 0.001 µm to less than 5 µm.

As the method for obtaining a polymer alloy with such a structure, a method of using the spinodal decomposition described later is preferred. Moreover, for obtaining more excellent properties, it is preferred to control for forming a co-continuous structure with a wavelength of concentration fluctuation of 0.002 to 1 µm or a dispersed structure with a distance between particles of 0.002 to 1 µm. Moreover, it is more preferred to control for forming a co-continuous structure with a wavelength of concentration fluctuation of 0.003 to 0.5 µm or a dispersed structure with a distance between particles of 0.003 to 0.5 µm. Still furthermore, it is most preferred to control for forming a co-continuous structure with a wavelength of concentration fluctuation of 0.003 to 0.3 µm or a dispersed structure with a distance between particles of 0.003 to 0.3 µm.

In general, a polymer alloy comprising two resins contained as components can have a miscible system, immiscible system or partially miscible system. A miscible system refers to a system in which the resins are miscible with each other under no shear flow, that is, in an equilibrium state in the entire practical temperature range from the glass transition temperature to the thermal decomposition temperature. An immiscible system refers to a system in which the resins are immiscible with each other in the entire temperature range, contrary to the miscible system. A partially miscible system refers to a system in which the reins are miscible with each other in a specific range of temperatures and in a specific range of composition ratios but is immiscible with each other in the other ranges. Furthermore, depending on the condition for causing phase separation, the partially miscible system can be either a system in which spinodal decomposition causes phase separation or a system in which nucleation and growth cause phase separation.

Moreover, in the case of a polymer alloy consisting of three or more components, there can occur a system in which all the three or more components are miscible with each other, a system in which all the three or more components are immiscible with each other, a system in which two or more components form a miscible mode while the remaining one or more components form an immiscible mode, a system in which two components form a partially miscible mode while the remaining components are distributed in said partially immiscible mode consisting of the two components, a system in which two components form a partially immiscible mode while the remaining components are immiscible with said two components, etc. In this invention, in the case of a polymer alloy consisting of three or more components, a system in which two components form an immiscible mode while the remaining components are distributed in the immiscible mode consisting of the two components is preferred. In this case, the structure of the polymer alloy is equivalent to the structure of an immiscible system consisting of two components. The following explanation is made in reference to a typical polymer alloy comprising two resins contained as components.

Even in the above immiscible system, compounding can induce spinodal decomposition. This is the so-called shear induced spinodal decomposition in which the resins are once made miscible with each other under high shear flow during compounding and are placed under no shear flow to cause phase separation. The basic portion of the shear induced spinodal decomposition is the same as the spinodal decomposition in a general partially miscible system. Therefore, the following describes the spinodal decomposition in a general partially miscible system and subsequently additionally describes the portion peculiar to the shear induced spinodal decomposition.

In general, the phase separation caused by the spinodal decomposition refers to the phase separation caused in the unstable state inside the spinodal curve in a phase diagram showing the relation between the composition ratio of two different resins contained as components and the temperature. On the other hand, the phase separation caused by nucleation and growth refers to the phase separation caused in the semi-stable state inside the bimodal curve and outside the spinodal curve in the phase diagram.

The spinodal curve refers to the curve drawn in the relation between the composition ratio and the temperature, at which curve the result ($\partial^2 \Delta Gmix/\partial \phi^2$) obtained by twice partially differentiating the difference ($\Delta Gmix$) between the free energy in the case where two different resins mixed as components are miscible, and the total of the free energies in immiscible two phases, with respect to the concentration ($\phi$), is 0. Inside the spinodal curve, an unstable state of $\partial^2 \Delta Gmix/\partial \phi^2 > 0$ occurs, and outside the spinodal curve, $\partial^2 \Delta Gmix/\partial \phi^2 < 0$ occurs.

The bimodal curve refers to the curve at the boundary between a miscible system region and immiscible system region in the relation between the composition ratio and the temperature.

A miscible state refers to a state where the components are homogeneously mixed on the molecular level. Particularly, it refers to a case where a mode consisting of different components does not form structural elements of 0.001 µm or more. Furthermore, an immiscible state refers to a state other than the miscible state. That is, it refers to a state where a mode consisting of different components forms structural elements of 0.001 µm or more. In this case, the structural elements of 0.001 µm or more refer to, for example, a co-continuous structure with a wavelength of concentration fluctuation of 0.001 to 1 µm, or a dispersed structure with a distance between particles of 0.001 to 1 µm. Being miscible or not can be judged using an electron microscope or differential scanning calorimeter (DSC) or any of various other methods, for example, as described in "Polymer Alloys and Blends, Leszek A. Utracki, Hanser Publishers, Munich Viema N.Y., P. 64."

According to the detailed theory, in spinodal decomposition, in the case where the temperature of a mixture system made homogeneously miscible once at a temperature of a miscible range is suddenly changed to a temperature of an unstable range, the system quickly initiates phase separation toward an equilibrium concentration. In this case, the concentration is made monochromatic into a certain wavelength, and a co-continuous structure in which both the separated phases are continuously and regularly entangled with each other at a wavelength of concentration fluctuation (Λm), is formed. After this co-continuous structure is formed, while the wavelength of concentration fluctuation is kept constant, only the difference between the concentrations of both the phases increases. This state is called the early stage of spinodal decomposition.

The wavelength of concentration fluctuation (Λm) in the above-mentioned early stage of spinodal decomposition has thermodynamically the following relation.

$$\Lambda m \sim [|Ts-T|/Ts]^{-1/2}$$

(where Ts is the temperature on the spinodal curve)

The co-continuous structure refers to a structure in which both the resins mixed as components form continuous phases respectively and are three-dimensionally entangled with each other. A typical view of the co-continuous structure is described, for example, in "Polymer Alloys: Foundation and Applications (second edition) (Chapter 10.1) (in Japanese)" (Edited by the Society of Polymer Science, Japan: Tokyo Kagaku Dojin).

In the shear induced spinodal decomposition, the application of shear flow expands the miscible region. That is, since the spinodal curve is greatly changed due to the application of shear flow, the substantial supercooling degree (|Ts−T|) becomes large even if the temperature change is equal, compared with the above-mentioned general spinodal decomposition in which the spinodal curve does not change. As a result, the wavelength of concentration fluctuation in the early stage of spinodal decomposition in the aforesaid formula can be easily shortened.

The spinodal decomposition that has undergone the early stage as described above reaches the intermediate stage where the increase of wavelength and the increase of concentration difference occur simultaneously. After the concentration difference has reached the equilibrium concentration, the increase of wavelength occurs as if to follow autosimilarity in the late stage. After undergoing this stage, the spinodal decomposition progresses till finally the separation into two microscopic phases occurs. In this invention, it is only required to fix the structure in the stage where a desired wavelength of concentration fluctuation has been reached before the final separation into two macroscopic phases. Furthermore, in the process where the wavelength increases from the intermediate stage to the late stage, it can happen that one phase becomes discontinuous due to the influence of the composition ratio or interfacial tension, to change from the aforesaid co-continuous structure to the dispersed structure. In this case, it is only required to fix the structure in the stage where a desired distance between particles has been reached.

The dispersed structure refers to a so-called sea-isles structure in which particles of one phase are dotted in a matrix of the other continuous phase.

The method for coarsening from the early stage is not especially limited. However, a method of heat-treating at a temperature higher than the lowest temperature among the glass transition temperatures of the individual resins contained as components constituting the polymer alloy can be preferably used. Furthermore, in the case where the polymer alloy has a single glass transition temperature in its miscible state or in the case where the glass transition temperature of the polymer alloy is between the glass transition temperatures of the individual resins contained as the components constituting the polymer alloy in a state where phase separation progresses, it is more preferred to heat-treat at a temperature higher than the lowest temperature among the glass transition temperatures in the polymer alloy. Moreover, in the case where one of the individual resins used as the components constituting the polymer alloy is a crystalline resin, it is preferred that the heat treatment temperature is higher than the crystal melting temperature of the crystalline resin, since the coarsening by the heat treatment can be effectively achieved. Still furthermore, it is preferred that the heat treatment temperature is within $\pm 20°$ C. of the crystal melting temperature of the crystalline resin, since the coarsening can be easily controlled. It is more preferred that the heat treatment temperature is within $\pm 10°$ C. of the crystal melting temperature. In the case where two or more of the resins used as the components are crystalline resins, it is preferred that the heat treatment temperature is within $\pm 20°$ C. of the highest crystal melting temperature among the crystal melting temperatures of the crystalline resins. It is more preferred that the heat treatment temperature is within $\pm 10°$ C. of the highest crystal melting temperature.

The method for fixing the structure formed by the spinodal decomposition can be a method of fixing the structure(s) of either or both of the separated phases by quick cooling or the like. In the case where one of the components is thermosetting, a method of using the phenomenon that the phase formed by the thermosetting component cannot move freely after completion of a reaction can be used. In the case where one of the components is a crystalline resin, a method of using the phenomenon that the crystalline resin phase cannot move freely after crystallization can be used. Among them, in the case where a crystalline resin is used, a method of fixing the structure by means of crystallization can be preferably used.

On the other hand, in a system where nucleation and growth cause phase separation, a dispersed structure is formed as a sea-isles structure already in the early stage, and it grows. So, it is difficult to form a regularly arranged co-continuous structure or dispersed structure.

To confirm that the co-continuous structure or dispersed structure of this invention has been obtained, it is important to confirm a regular periodical structure. For this purpose, for example, the structure is observed with an optical microscope or transmission electron microscope, to confirm that a co-continuous structure is formed, and in addition, a light scattering instrument or small-angle X-ray scattering instrument is used for scattering measurement to confirm that a scattering maximum appears. The optimum measuring ranges of light scattering instruments and small-angle X-ray scattering instruments are different from instrument to instrument. So, an adequate instrument with a measuring range suitable for the wavelength of concentration fluctuation should be selected. The existence of a scattering maximum in scattering measurement proves that a regularly phase-separated structure with a certain period exists. The period $\Lambda m$ corresponds to the wavelength of concentration fluctuation in the case of co-continuous structure, and corresponds to the distance between particles in the case of dispersed structure. The value can be calculated using the wavelength $\lambda$ of scattered light in a scattering body and the scattering angle $\theta m$ giving the scattering maximum from the following formula;

$$\Lambda m = (\lambda/2)/\sin(\theta/2)$$

To induce the spinodal decomposition, it is necessary to once make the two or more resins contained as components miscible with each other and then to arrive at the unstable state inside the spinodal curve. In the spinodal decomposition in a general partially miscible system, if the temperature is quickly changed to an immiscible range after compounding in a miscible condition, the spinodal decomposition can be induced. On the other hand, in said shear induced spinodal decomposition, making miscible under high shear flow in an immiscible system is followed by being kept under no shear flow, to induce the spinodal decomposition.

The combination of a polycarbonate resin and another resin that can be separated into phases by the shear induced spinodal decomposition is a combination of resins that are immiscible with each other under no shear flow and are miscible with each other under shear flow, allowing the spinodal decomposition to be induced by the change from shear flow to no shear flow. Particularly, examples of the combination include a combination consisting of a polycarbonate resin and styrene-acrylonitrile copolymer, a combination consisting of a polycarbonate resin and a thermoplastic polyester resin, a combination consisting of a polycarbonate resin and styrene-butadiene copolymer, a combination consisting of a polycarbonate resin and the hydrogenation product of styrene-butadiene copolymer, etc. Above all, a combination consisting of a polycarbonate resin and styrene-acrylonitrile copolymer and a combination consisting of a polycarbonate resin and a thermoplastic polyester resin are preferred. Especially a combination consisting of a polycarbonate resin and a thermoplastic polyester resin is preferred.

Said thermoplastic polyester resin refers to a saturated polyester resin synthesized by an esterification reaction from a dibasic acid or any of its ester-formable derivatives and a diol or any of its derivatives.

Examples of the basic acid or any of its ester-formable derivatives include aromatic dicarboxylic acids such as terephthalic acid, isophthalic acid, phthalic acid, 2,6-naphthalenedicarboxylic acid, 1,5-naphthalenedicarboxylic acid, bis(p-carboxyphenyl)methane, anthracenedicarboxylic acid, 4,4'-diphenyletherdicarboxylic acid, and 5-sodiumsulfoisophthalic acid, aliphatic dicarboxylic acids such as adipic acid, sebacic acid, azelaic acid, and dodecanedioic acid, alicyclic dicarboxylic acids such as 1,3-cyclohexanedicarboxylic acid and 1,4-cyclohexanedicarboxylic acid, their lower alcohol esters, etc. Examples of the diol or any of its derivatives include aliphatic glycols with 2 to 20 carbon atoms such as ethylene glycol, propylene glycol, 1,4-butanediol, neopentyl glycol, 1,5-pentanediol, 1,6-hexanediol, decamethylene glycol, cyclohexanedimethanol, and cyclohexanediol, and long-chain glycols with a molecular weight of 400 to 6000 such as polyethylene glycol, poly-1,3-propylene glycol, polytetramethylene glycol, their ester-formable derivatives, etc. One or more of the dibasic acids and their ester-formable derivatives and one or more of the diols and their derivatives can be used to produce a polymer or copolymer.

Preferred examples of the polymer or copolymer include polybutylene terephthalate, polybutylene (terephthalate/isophthalate), polybutylene (terephthalate/adipate), polybutylene (terephthalate/sebacate), polybutylene (terephthalate/decanedicarboxylate), polybutylene naphthalate, polyethylene terephthalate, polyethylene (terephthalate/isophthalate), polyethylene (terephthalate/adipate), polyethylene (terephthalate/5-sodiumsulfoisophthalate), polybutylene (terephthalate/5-sodiumsulfoisophthalate), polyethylene naphthalate, polycyclohexanedimethylene terephthalate, polypropylene terephthalate, etc. Among them, polybutylene terephthalate, polybutylene (terephthalate/adipate), polybutylene (terephthalate/decanedicarboxylate), polybutylene naphthalate, polyethylene terephthalate, polyethylene (terephthalate/adipate), polyethylene naphthalate, polycyclohexanedimethylene terephthalate, and polypropylene terephthalate are preferred. Polybutylene terephthalate, polyethylene terephthalate, and polypropylene terephthalate are more preferred. Most preferred is polybutylene terephthalate.

The polybutylene terephthalate refers to a polymer obtained with terephthalic acid or any of its ester-formable derivatives and 1,4-butanediol or any of its ester-formable derivatives as main components by means of polycondensation reaction. It can also contain a co-monomer as a component, and it is preferred that the copolymerized amount of the co-monomer contained as a component is 20 mol % or less based on the amount of all the monomers.

Preferred examples of the polymers and copolymers include polybutylene terephthalate, polybutylene (terephthalate/isophthalate), polybutylene (terephthalate/adipate), polybutylene (terephthalate/sebacate), polybutylene (terephthalate/decanedicarboxylate), polybutylene (terephthalate/naphthalate), poly(butylenes/ethylene) terephthalate, etc. Any one of them can be used, or two or more of them can also be used as a mixture.

Furthermore, as for the above-mentioned thermoplastic polyester, in view of molding properties and mechanical properties, it is preferred that the intrinsic viscosity of its o-chlorophenol solution measured at 25° C. is in a range from 0.36 to 1.60, especially 0.52 to 1.25. Moreover, a range from 0.6 to 1.0 is most preferred.

The mixing ratio of the polycarbonate resin and the other resin to be made miscible with the polycarbonate resin under said shear flow is not especially limited, but it is preferred to use 1 to 1000 parts by weight of the other resin per 100 parts by weight of the polycarbonate resin. It is more preferred to use 10 to 1000 parts by weight of the other resin per 100 parts by weight of the polycarbonate resin. It is most preferred to use 10 to 500 parts by weight of the other resin.

Furthermore, it is preferred to add a third component such as a block copolymer, graft copolymer or random copolymer respectively containing the component constituting the polycarbonate resin composition to the above-mentioned polymer alloy, for such reasons that the free energy at the interface between the separated phases can be lowered and that the wavelength of concentration fluctuation in the co-continuous structure or the distance between particles in the dispersed structure can be easily controlled. In this case, since the third component is usually distributed into the respective phases of the polymer alloy consisting of two resins contained as components excluding the third component, the polymer alloy obtained can be handled like the polymer alloy consisting of two resins contained as components.

Moreover, as other resins in the polymer alloy of this invention, the above-mentioned preferred resins can further contain other thermoplastic resins and thermosetting resins to such an extent that the structure of this invention is not impaired. Examples of the thermoplastic resins include polyethylene, polyamides, polyphenylene sulfide, polyetheretherketone, liquid crystal polyesters, polyacetals, polysulfones, polyethersulfones, polyphenylene oxide, etc. Examples of the thermosetting resins include phenol resins, melamine resins, unsaturated polyester resins, silicone resins, epoxy resins, etc.

Still furthermore, it is preferred to let the polymer alloy of this invention contain a rubbery polymer, since excellent low-temperature impact resistance can be obtained. A rubbery polymer refers to a solid with rubbery elasticity at room temperature, and examples of the compound containing the rubbery polymer include thermoplastic elastomers, rubber-modified polystyrene-based resins, core-shell polymers, etc. In this case, a thermoplastic elastomer generally refers to a polymeric substance that is a solid with rubbery elasticity at room temperature but can be compounded if heated since the viscosity declines. A rubber-modified polystyrene-based resin generally refers to a polymeric substance having a rubbery polymer mixed in a polystyrene-based resin. A core-shell polymer generally refers to a core-shell type graft copolymer having a multi-layer structure in which a rubber layer as a core layer is included in a vitreous resin.

Among these examples of the compound containing the rubbery polymer, a core-shell polymer can be preferably used.

The thermoplastic elastomer used is not especially limited, and examples of the thermoplastic elastomer include olefin-based elastomers, styrene-based elastomers, polyester-based elastomers, polyamide-based elastomers, urethane-based elastomers, etc. Examples of the olefin-based elastomers include copolymers containing ethylene and/or propylene as a main component, particularly ethylene-propylene copolymer, ethylene-butene copolymer, ethylene-octene copolymer, ethylene-propylene-butene copolymer, ethylene-propylene-diene copolymer, ethylene-ethyl acrylate copolymer, ethylene-vinyl acetate copolymer, ethylene-glycidyl methacrylate copolymer, etc. The styrene-based elastomer can be, for example, a block copolymer consisting of a polymer block mainly containing a vinyl aromatic compound such as styrene and a polymer block mainly containing a non-hydrogenated and/or hydrogenated conjugated diene compound. The vinyl aromatic compound as a component of the block copolymer can be one or more selected, for example, from styrene, α-methylstyrene, vinyltoluene, p-tertiary butylstyrene, divinylbenzene, p-methylstyrene, 1,1-diphenylstyrene, etc. Among them, styrene is preferred. Furthermore, as the conjugated diene compound, one or more are selected, for example, from butadiene, isoprene, 1,3-pentadiene, 2,3-dimethyl-1,3-butadiene, 3-butyl-1,3-octadiene, phenyl-1,3-butadiene, etc. Among them, butadiene, isoprene and their combination are preferred. The block copolymer in this case refers to a block copolymer consisting of a polymer block A mainly containing a vinyl aromatic compound and a polymer block B mainly containing a conjugated diene compound. It is preferred that the copolymerization ratio of the vinyl aromatic compound and the conjugated diene compound is 5/95 to 70/30, especially 10/90 to 60/40. The polyester-based elastomer can be, for example, a block copolymer consisting of an aromatic polyester such as polyethylene terephthalate or polybutylene terephthalate as a hard segment and a polyether such as polyethylene glycol or polytetramethylene glycol or an aliphatic polyester such as polyethylene adipate, polybutylene adipate or polycaprolactone as a soft segment. The polyamide-based elastomer can be, for example, a block copolymer containing nylon 6, nylon 66, nylon 11, nylon 12 or the like as a hard segment and a polyether or aliphatic polyester as a soft segment. The urethane-based elastomer can be, for example, a block copolymer containing a polyurethane obtained by letting a diisocyanate such as 4,4'-diphenylmethane diisocyanate, 4,4'-dicyclohexylmethane diisocyanate, tolylene diisocyanate or hexamethylene diisocyanate and a glycol such as ethylene glycol or tetramethylene glycol react with each other, as a hard segment, and a polyether such as polyethylene glycol, polypropylene glycol or polytetramethylene glycol or an aliphatic polyester such as polyethylene adipate, polybutylene adipate or polycaprolactone as a soft segment.

The rubber-modified polystyrene-based resin is obtained by mixing a rubbery polymer into a polystyrene-based resin. The mixing method can be a simple mechanical blending method, but for obtaining good miscibility, it is preferred that the rubber-modified polystyrene-based resin is obtained by so-called graft copolymerization in which a styrene-based monomer or the like is graft-copolymerized in the presence of a rubbery polymer. Furthermore, it is also desirable to use a rubber-modified polystyrene-based resin obtained by a so-called graft-blending method in which a polystyrene-based resin obtained by another method is blended with a rubber-modified polystyrene-based resin obtained by said method (graft polymer). Examples of the rubbery polymer include conjugated diene-based rubbers such as polybutadiene, styrene-butadiene copolymer, hydrogenated styrene-butadiene block copolymer, and non-conjugated diene-based rubbers such as ethylene-propylene-based copolymers. Among them, polybutadiene is preferred. Examples of the styrene-based monomer include styrene, α-methylstyrene, p-methylstyrene and bromostyrene, but among them, it is most suitable to use styrene and/or α-methylstyrene. Examples of the monomer other than the styrene-based monomer include vinyl monomers such as acrylonitrile and methyl methacrylate.

As the core-shell polymer, preferred is a core-shell polymer having a multi-layer structure in which a rubber layer preferably with an average particle size of 1.0 μm or less is included in a glassy resin. As the rubber layer of the core-shell polymer, a polymer or copolymer obtained by polymerizing or copolymerizing/graft-copolymerizing one or more selected from a silicon-based elastomer, diene-based elastomer or acryl-based elastomer can be used. The silicon-based elastomer is produced by polymerizing an organosiloxane monomer, and examples of the organosiloxane include hexamethyltricyclosiloxane, octamethylcyclosiloxane, decamethylpentacyclosiloxane, dodecamethylhexacyclosiloxane, trimethyltriphenylsiloxane, tetramethylphenylcyclotetrasiloxane, octaphenylcyclotetrasiloxane, etc. The acryl-based rubber can be obtained by polymerizing an acrylic ester such as butyl acrylate and a small amount of a crosslinkable monomer such as butylene diacrylate. Examples of the acrylic ester include methyl acrylate, ethyl acrylate, propyl acrylate, hexyl acrylate and 2-ethylhexyl acrylate in addition to butyl acrylate. Furthermore, examples of the crosslinkable monomer include butylene dimethacrylate, esters obtained from a polyol such as trimethylolpropane and acrylic acid, vinyl compounds such as divinylbenzene, vinyl acrylate and vinyl methacrylate, and allyl compounds such as allyl acrylate, allyl methacrylate, diallyl maleate, diallyl fumarate, diallyl itaconate, monoallyl maleate, monoallyl fumarate and triallyl cyanurate, in addition to butylene diacrylate. The diene-based rubber can be, for example, polybutadiene obtained by polymerizing butadiene monomer. Furthermore, for the shell layer formed by a vitreous resin of the core-shell copolymer, a vinyl-based polymer is used. The vinyl-based polymer can be obtained by polymerizing or copolymerizing at least one monomer selected from among aromatic vinyl monomers, vinyl cyanide monomer, methacrylic ester monomers and acrylic ester monomers. The rubber layer and the shell layer of the core-shell copolymer are usually bonded by graft copolymerization. The graft copolymerization can be achieved by adding, if necessary, a graft crossing agent capable of reacting with the shell layer during the polymerization of the rubber layer for giving reactive groups to the rubber layer, and subsequently forming the shell layer. As the graft crossing agent for a silicone-based rubber, an organosiloxane with a vinyl bond or an organosiloxane with a thiol is used, and preferably acryloxy siloxane, methacryloxy siloxane and vinyl siloxane can be used. Examples of the above-mentioned core-shell polymer include KANEACE (registered trademark) FM produced by Kaneka Corp., METABLEN (registered trademark) W-300, W-530 and S-2001 produced by Mitsubishi Rayon Co., Ltd., Acryloid (registered trademark) KM-323 and KM-330 produced by Rohm and Haas, Paraloid (registered trademark) EXL-2311, -2602, and -3211 produced by Kureha Chemical Industry Co., Ltd., Stafiloid (registered trademark) P-3267 produced by Takeda Pharmaceutical Co., Ltd., etc.

The added amount of the rubbery polymer is not especially limited, but it is preferred that the amount of the rubbery polymer is from 1 to 100 parts by weight per 100 parts by weight of the polycarbonate resin. It is more preferred that the amount is from 2 to 50 parts by weight per 100 parts by weight of the polycarbonate resin, and it is most preferred that the amount is from 5 to 30 parts by weight per 100 parts by weight of the polycarbonate resin.

The added amount in total of the polycarbonate resin and the resins other than said polycarbonate resin (including the resin miscible with the polycarbonate resin under shear flow with the shear rate kept in a range from 100 to 10000 $\sec^{-1}$, rubbery polymer, other thermoplastic resins and thermosetting resins, etc.) is not especially limited, but it is preferred that the amount in total of the resins other than the polycarbonate resin is from 10 to 1000 parts by weight per 100 parts by weight of the polycarbonate resin. It is more preferred that the amount in total of the resins other than the polycarbonate resin is from 10 to 500 parts by weight per 100 parts by weight of the polycarbonate resin.

The other thermoplastic resin, rubbery polymer and thermosetting resin can be mixed at any desired stage while the polymer alloy of this invention is manufactured. For example, a method of adding them simultaneously when the two resins are added, or a method of adding them after compounding the two resins, or a method of adding them to one of the two resins, compounding the mixture and adding the other resin can be employed.

Furthermore, it is preferred that the polymer alloy of this invention contains inactive particles. As the inactive particles, preferably used are inorganic particles such as crosslinked polymeric particles, alumina particles, spherical silica particles, cohesive silica particles, aluminum silicate particles, calcium carbonate particles, titanium oxide particles and kaolin particles. Among them, crosslinked polymeric particles, alumina particles, spherical silica particles and aluminum silicate particles can be preferably used.

It is preferred that the average particle size of the inactive particles is from 0.001 to 5 µm. A more preferred range is from 0.01 to 3 µm. It is preferred that the added amount of the inactive particles is from 0.01 to 10 parts by weight per 100 parts by weight of the polycarbonate resin. A more preferred range is from 0.05 to 5 parts by weight. It is not preferred that the amount of the inactive particles is less than 0.01 part by weight, since the slipperiness during molding into a film or sheet becomes so poor as to degrade molding properties. On the other hand, it is not preferred either that the amount of the inactive particles becomes more than 10 parts by weight on the contrary, since the toughness may become poor.

It is also preferred that the polymer alloy of this invention contains a releasing agent. Examples of the releasing agent include ester compounds obtained from a long-chain aliphatic carboxylic acid such as stearic acid or montanic acid and a polyhydric alcohol such as ethylene glycol, glycerol or pentaerythritol, amide compounds obtained from a long-chain aliphatic carboxylic acid such as stearic acid or montanic acid and stearylamine or ethylenediamine, polyethylene, silicone compounds, etc. Preferred examples of the releasing agent are polyethylene, silicone compounds, ethylene glycol ester and ethylene bis-stearylamide of montanic acid, etc.

It is preferred that the added amount of the releasing agent is from 0.001 to 1 part by weight per 100 parts by weight of the polycarbonate resin, and a more preferred range is from 0.005 to 0.8 part by weight. It is not preferred that the amount of the releasing agent is less than 0.001 part by weight, since the releasability at the time of injection molding becomes so poor as to degrade molding properties. It is not preferred either that the amount of the releasing agent is more than 1 part by weight on the contrary, since the releasing agent may bleed out on the surface of the molded article to degrade the appearance of the molded article while the mold may be contaminated.

Meanwhile, the polymer alloy of this invention can further contain various additives to such an extent that the object of this invention is not impaired. Examples of the additives include reinforcing materials such as talc, kaolin, mica, clay, bentonite, sericite, basic magnesium carbonate, aluminum hydroxide, glass flakes, glass fibers, carbon fibers, asbestos fibers, rock wool, calcium carbonate, silica sand, wollastonite, barium sulfate, glass beads and titanium oxide, non-tabular filler, antioxidant (based on phosphorus, sulfur, etc.), ultraviolet light absorber, thermal stabilizer (based on hindered phenol, etc.), ester interchange reaction inhibitor, lubricant, releasing agent, antistatic agent, blocking preventive, colorant such as dye or pigment, flame retarder (based on halogen, phosphorus, etc.), flame retardant auxiliary (antimony compound typified by antimony trioxide, zirconium oxide, molybdenum oxide, etc.), foaming agent, coupling agent (silane coupling agent or titanium coupling agent containing one or more kinds of epoxy group, amino group, mercapto group, vinyl group and isocyanate group), antimicrobial agent, etc.

These additives can be mixed at any desired stage while the polymer alloy of this invention is manufactured. For example, a method of adding them simultaneously when the two resins are added, or a method of adding them after compounding the two resins, or a method of adding them to one of the two resins, compounding the mixture and adding the other resin can be employed.

The polymer alloy of this invention is generally provided as pellets. It is preferred that in the case where the infrared absorption spectrum of the pellets is measured, the infrared absorption peak intensity ratio (the following formula 2) on the surfaces of the pellets is 0.43 or more. More preferred is 0.45 or more. A preferred range of the infrared absorption peak intensity ratio is from 0.45 to 0.7, and the most preferred range is from 0.45 to 0.6.

Infrared absorption peak intensity ratio=$Ip(2933\ cm^{-1})/Ip(2965\ cm^{-1})$      [Formula 2]

$Ip(2933\ cm^{-1})$: Peak intensity of the infrared absorption appearing in a range of $2933\pm5\ cm^{-1}$ on the surfaces of the pellets $Ip(2965\ cm^{-1})$: Peak intensity of the infrared absorption appearing in a range of $2965\pm5\ cm^{-1}$ on the surfaces of the pellets The absorption peak intensities in the infrared absorption spectrum and their measuring method are as described for said formula 1.

As for the particular method for manufacturing said pellets, as in the above-mentioned method for manufacturing the polymer alloy of this invention, the pellets can be manufactured by compounding at least two resins used as components including a polycarbonate resin, discharging as a strand or sheet, quickly cooling in water, and pelletizing.

The shape of the pellets is not especially limited, but it is preferred that the pellets have a size and form suitable for publicly known plastic working such as injection molding or extrusion molding. Examples of the shape include cylinders with a diameter of 1 to 6 mm, preferably 1.5 to 4 mm and a length of 2 to 6 mm, preferably 2.5 to 4 mm, and rectangles with a length and width of 3 to 6 mm respectively and a thickness of 1.5 to 3 mm.

Furthermore, it is preferred that said pellets contain a releasing agent as described before. The whole of the releasing agent can be contained inside the pellets, but it is also preferred that some or whole of the releasing agent exists on the surfaces of the pellets. That is, the pellets and the releasing agent can also be dry-blended.

The pellets can be molded into a desired form by a desired method. Examples of the molding method include melt spinning, melt film formation, injection molding, extrusion molding, inflation molding, blow molding, etc.

The polymer alloy of this invention can be formed into a film or sheet by means of melt film formation. It is preferred that in the case where the infrared absorption spectrum of the film or sheet is measured, the infrared absorption peak intensity ratio (the following formula 3) on the surface of the film or sheet is 0.43 or more. More preferred is 0.45 or more. A preferred range of the infrared absorption peak intensity ratio is from 0.45 to 0.7, and the most preferred range is from 0.45 to 0.6.

Infrared absorption peak intensity ratio=$If(2933\ cm^{-1})/If(2965\ cm^{-1})$      [Formula 3]

$If(2933\ cm^{-1})$: Peak intensity of the infrared absorption appearing in a range of $2933\pm5\ cm^{-1}$ on the surface of the film $If(2965\ cm^{-1})$: Peak intensity of the infrared absorption appearing in a range of $2965\pm5\ cm^{-1}$ on the surface of the film The absorption peak intensities in the infrared absorption spectrum and their measuring method are as described for said formula 1.

Furthermore, in the film or sheet, it is preferred that the polycarbonate resin and the resin other than the polycarbonate resin form a co-continuous structure with a wavelength of concentration fluctuation of 0.001 µm to less than 5 µm or a dispersed structure with a distance between particles of 0.001 µm to less than 5 µm.

As the method for obtaining a film or sheet with said structure, a method of using the aforesaid spinodal decomposition is preferred. For obtaining more excellent properties, it is preferred to control for forming a co-continuous structure with the wavelength of concentration fluctuation kept in a range from 0.002 to 1 µm or a dispersed structure with the distance between particles kept in a range from 0.002 to 1 µm, and it is more preferred to control for forming a co-continuous structure with the wavelength of concentration fluctuation kept in a range from 0.003 to 0.5 µm or a dispersed structure with the distance between particles kept in a range from 0.003 to 0.5 µm. It is most preferred to control for forming a co-continuous structure with the wavelength of concentration fluctuation kept in a range from 0.003 to 0.3 µm or a dispersed structure with the distance between particles kept in a range from 0.003 to 0.3 µm.

Moreover, as the resin other than the polycarbonate resin used in said film or sheet, a resin that is immiscible with the polycarbonate resin under no shear flow and can be made miscible by compounding as described in the section for said polymer alloy can be preferably used. Above all, a combination consisting of a polycarbonate resin and a thermoplastic polyester resin is preferred, and furthermore, a combination consisting of a polycarbonate resin and polybutylene terephthalate resin is especially preferred.

A preferred method for manufacturing the film or sheet is a method comprising the steps of discharging the polycarbonate resin composition compounded using a double-screw extruder from its T die, and subsequently cooling the resin composition for solidifying it, like the preferred manufacturing method described in the section for said polymer alloy. More particular methods include a method of cooling and solidifying the discharged resin composition using a casting drum for fixing the structure, and a polishing method or a calendering method of forming the discharged resin composition between two rolls, though not especially limited to these methods. For keeping the molten resin in contact with the casting drum when the molten resin is cast on the casting drum, for example, a method of applying static electricity, a method of using an air knife or a method of using a contact drum in opposite to the casting drum can also be used. In the case where the molten resin is cast on the casting drum, it is preferred to install the casting drum directly below the discharge port for quick cooling.

Moreover, the obtained film can also be stretched. The stretching method is not especially limited, and either sequential biaxial stretching or simultaneous biaxial stretching can be used. Furthermore, a stretching ratio in a range from 2 to 8 times and a stretching speed in a range from 500 to 5000%/min can be preferably used. As a usually preferably used method, the heat treatment during stretching is performed at a temperature higher than the lowest temperature among the glass transition temperatures of the individual resins used as the components of the polymer alloy. In the case where the polymer alloy is in a miscible state and has a single glass transition temperature or in the case where the glass transition temperature of the polymer alloy in a state where phase decomposition takes place is between the glass transition temperatures of the individual resins contained as the components of the polymer alloy, it is preferred that the heat treatment is performed at the lowest temperature of the glass transition temperatures in the polymer alloy. In the case where crystalline resins are used as the individual resins contained as the components of the polymer alloy, it is preferred that the heat treatment temperature is lower than the heating crystallization temperatures of the crystalline resins, since the inhibition of stretching by crystallization of the crystalline resins is less liable to occur. It is preferred that the stretched film is further heat-treated for use as a film with a stabilized structure. As a usually preferably used method, the heat treatment for stabilization is performed at a temperature higher than the lowest temperature among the glass transition temperatures of the individual resins contained as the components of the polymer alloy. In the case where the glass transition temperature of the polymer alloy in a state where phase separation takes place is between the glass transition temperatures of the resins contained as the components of the polymer alloy, it is preferred to perform the heat treatment at a temperature higher than the lowest temperature of the glass transition temperatures in the polymer alloy. Furthermore, the stretched film can have a longer wavelength of concentration fluctuation or a longer distance between particles owing to the stretching. It is preferred that the resins of the polymer alloy in the stretched film have a co-continuous structure with a wavelength of concentration fluctuation of 0.001 to 1 µm or a dispersed structure with a distance between particles of 0.001 to 1 µm, since excellent mechanical properties can be obtained. Furthermore, in view of the transparency of the film, it is preferred that they have a co-continuous structure with a wavelength of concentration fluctuation of 0.001 to 0.1 µm or a dispersed structure with a distance between particles of 0.001 to 0.1 µm.

The chemical composition comprising the resins contained as the components of the film or sheet is the same as that of the polymer alloy. For use as a sheet or film, it is preferred to add the inactive inorganic particles and/or crosslinked polymeric particles described in the section for said polymer alloy, for improving the windability at the time of film formation.

Moreover, said film or sheet can also contain various additives including a rubbery polymer, etc., as described in the section for said polymer alloy. These additives can be mixed at any desired stage during the manufacture of said film or sheet, but a method of adding a master batch obtained by adding these additives to either of the resins constituting the polymer alloy can be usually preferably used. Furthermore, in the case where said various additives such as a rubbery polymer are further contained, acceptable is a structure in which the other additives such as a rubbery polymer are dispersed as components in the resin composition with said preferred wavelength of concentration fluctuation.

Said polymer alloy can be injection-molded into an injection-molded article. It is preferred that in the case where the infrared absorption spectrum of the injection-molded article is measured, the infrared absorption peak intensity ratio (the following formula 4) on the surface of the injection-molded article is 0.43 or more. More preferred is 0.45 or more. A preferred range of the infrared absorption peak intensity ratio is from 0.45 to 0.7, and the most preferred range is from 0.45 to 0.6.

Infrared absorption peak intensity ratio=$Ii(2933\ cm^{-1})/Ii(2965\ cm^{-1})$   [Formula 4]

$Ii$ (2933 $cm^{-1}$): Peak intensity of the infrared absorption appearing in a range of 2933±5 $cm^{-1}$ on the surface of the injection-molded article $Ii(2965\ cm^{-1})$: Peak intensity of the infrared absorption appearing in a range of 2965±5 $cm^{-1}$ on the surface of the injection-molded article The absorption peak intensities in the infrared absorption spectrum and their measuring method are as described for said formula 1.

Furthermore, in said injection-molded article, it is preferred that the polycarbonate resin and the resin other than the polycarbonate resin form a co-continuous structure with a wavelength of concentration fluctuation of 0.001 μm to less than 5 μm or a dispersed structure with a distance between particles of 0.001 μm to less than 5 μm.

As the method for obtaining an injection-molded article with said structure, a method of using the aforesaid spinodal decomposition is preferred. For obtaining more excellent properties, it is preferred to control for forming a co-continuous structure with the wavelength of concentration fluctuation kept in a range from 0.002 to 1 μm or a dispersed structure with the distance between particles kept in a range from 0.002 to 1 μm, and it is more preferred to control for forming a co-continuous structure with the wavelength of concentration fluctuation kept in a range from 0.003 to 0.5 μm or a dispersed structure with the distance between particles kept in a range from 0.003 to 0.5 μm. It is most preferred to control for forming a co-continuous structure with the wavelength of concentration fluctuation kept in a range from 0.003 to 0.3 μm or a dispersed structure with the distance between particles kept in a range from 0.003 to 0.3 μm.

As the combination of resins used for said injection-molded article, a combination immiscible under no shear flow and made miscible by compounding, as described in the section for the polymer alloy, can be preferably used. Above all, a combination consisting of a polycarbonate resin and a thermoplastic polyester resin is preferred, and furthermore, a combination consisting of a polycarbonate resin and polybutylene terephthalate resin is especially preferred.

The added amounts of the resins constituting the injection-molded article are not especially limited. However, it is preferred that the amount of the resin other than the polycarbonate is from 10 to 1000 parts by weight per 100 parts by weight of the polycarbonate resin. It is more preferred that the amount of the resin other than the polycarbonate resin is from 10 to 100 parts by weight per 100 parts by weight of the polycarbonate resin. In the case where a molded long article or a precisely molded article is obtained, it is preferred that the added amount of the polycarbonate resin is decreased to lower the flowability at the time of injection molding.

A preferred method for manufacturing said injection-molded article is as described below. In a double-screw extruder capable of applying high shear flow, the resins destined to be an injection-molded article are once made miscible with each other at a high shear stress as in the manufacturing method described in the section for said polymer alloy, and the mixture is discharged from the extruder and immediately cooled, to produce pellets with a structure in which the two resins contained as components are fixed in a miscible state or pellets having a co-continuous structure with a wavelength of concentration fluctuation of 0.4 μm or less in the early stage of spinodal decomposition. The pellets are injection-molded to let the spinodal decomposition progress in the process of injection molding, for forming an injection molded article having a co-continuous structure with a wavelength of concentration fluctuation of 0.001 μm to less than 5 μm or a dispersed structure with a distance between particles of 0.001 μm to less than 5 μm.

Meanwhile, the polymer alloy constituting said injection-molded article can also further contain various additives to such an extent that the object of this invention is not impaired, as described in the section for said polymer alloy. Especially in the case where said injection-molded article is manufactured, it is preferred to contain the releasing agent described in the section for said polymer alloy for improving the releasability of the molded article. These additives can be added at any desired stage while said injection-molded article is manufactured. For example, a method of adding them simultaneously when the two resins used as components are mixed, a method of adding them after compounding the two resins used as components, or a method of adding them to either of the two resins used as components, compounding the mixture and adding the other resin can be used.

Moreover, said injection-molded article can also further contain other thermoplastic resins, rubbery polymers and thermosetting resins in addition to the resin preferably used as the resin to be mixed with the polycarbonate resin, to such an extent that the structure of this invention is not impaired, as described in the section for said polymer alloy. The other thermoplastic resins, rubbery polymers and thermosetting resins can be added at any desired stage while said injection-molded article is manufactured. For example, a method of adding them simultaneously when the two resins used as components are mixed, a method of adding them after compounding the two resins used as components, or a method of adding them to either of the two resins used as components, compounding the mixture and adding the other resin can be used. Moreover, in the case where said other various additives such as a rubbery polymer and other resins are further contained, also acceptable is a structure in which the other additives such as a rubbery polymer and resins are dispersed in the resin composition having said preferred wavelength of structural fluctuation.

The second version of this invention is a thermoplastic resin composition comprising a polymer alloy, in which at least polybutylene terephthalate resin and a polycarbonate resin are mixed, and a filler, wherein said filler is the following inorganic particles (a) and/or glass fibers (b), and said polymer alloy forms a co-continuous structure with a wavelength of concentration fluctuation of 0.001 to 5 μm or a dispersed structure with a distance between particles of 0.001 to 5 μm;
(a) Inorganic particles with a number average particle size of 10 μm or less, as measured by the laser diffraction method;
(b) Glass fibers, not less than 60 wt % of which in the thermoplastic resin composition has their fiber lengths kept in a range from 0.1 to 1 mm.

The polybutylene terephthalate resin used in this version of the invention is a polymer obtained with terephthalic acid or any of its ester-formable derivatives and 1,4-butanediol or any of its ester-formable derivatives as main components by means of polycondensation reaction. It can also contain a co-monomer as an component to such an extent that the properties are not impaired, and it is preferred that the copolymerized amount of the co-monomer contained as an component is 20 mol % or less based on the amount of all the monomers.

Preferred examples of the polymer or copolymer include polybutylene terephthalate, polybutylene (terephthalate/isophthalate), polybutylene (terephthalate/adipate), polybutylene (terephthalate/sebacate), polybutylene (terephthalate/decanedicarboxylate), polybutylene (terephthalate/naphthalate), poly(butylene/ethylene) terephthalate, etc. Any one of them can be used, and two or more of them can also be used as a mixture.

Furthermore, as for the polymer or copolymer, in view of molding properties and mechanical properties, it is preferred that the intrinsic viscosity of its o-chlorophenol solution measured at 25° C. is in a range from 0.36 to 1.60, especially 0.52 to 1.25. Moreover, a range from 0.6 to 1.0 is most preferred.

The polycarbonate resin used in this version of the invention is the same as that described for the section of the first version of the invention.

Furthermore, the thermoplastic resin composition of this version of the invention can also further contain other thermoplastic resins and thermosetting resins to such an extent that the structure of this invention is not impaired. These thermoplastic resins and thermosetting resins are the same as those enumerated in the section for the first version of the invention.

The other thermoplastic resins and thermosetting resins can be mixed at any desired stage while the thermoplastic resin composition of this version of the invention is manufactured. For example, a method of adding them simultaneously when the polybutylene terephthalate resin and the polycarbonate resin are added, or a method of adding them after compounding the polybutylene terephthalate resin and the polycarbonate resin, or a method of at first adding them to either of the polybutylene terephthalate resin and the polycarbonate resin, compounding the mixture and adding the other resin can be employed.

Meanwhile, the thermoplastic resin composition of this version of the invention can further contain various additives to such an extent that the object of this invention is not impaired. The additives are the same as those enumerated in the section for the first version of the invention.

These additives can be mixed at any desired stage while the thermoplastic resin composition of this version of the invention is manufactured. For example, a method of adding them simultaneously when the polybutylene terephthalate resin and the polycarbonate resin are added, or a method of adding them after compounding the polybutylene terephthalate resin and the polycarbonate resin, or a method of at first adding them to either of the polybutylene terephthalate resin and the polycarbonate resin, compounding the mixture and adding the other resin can be employed.

The thermoplastic resin composition of this version of the invention is required to be such that the polybutylene terephthalate resin and the polycarbonate resin form a co-continuous structure with a wavelength of concentration fluctuation of 0.001 to 5 μm or a dispersed structure with a distance between particles of 0.001 to 5 μm in the thermoplastic resin composition (for example, in the state of pellets). As the method for obtaining the thermoplastic resin composition with such a structure, as described in the section for the first version of the invention, a method of using the spinodal decomposition is preferred. For obtaining a thermoplastic resin composition with more excellent surface appearance, it is preferred to control for forming a co-continuous structure with the wavelength of concentration fluctuation kept in a range from 0.002 to 1 μl or a dispersed structure with the distance between particles kept in a range from 0.002 to 1 μm, and furthermore, it is more preferred to control for forming a co-continuous structure with the wavelength of concentration fluctuation kept in a range from 0.003 to 0.5 μm or a dispersed structure with the distance between particles kept in a range from 0.003 to 0.5 μm. It is most preferred to control for forming a co-continuous structure with the wavelength of concentration fluctuation kept in a range from 0.003 to 0.3 μm or a dispersed structure with the distance between particles kept in a range from 0.003 to 0.3 μm. If a thermoplastic resin composition with such a highly regular phase structure is used in this version of the invention, a molded article with excellent surface appearance can be obtained.

In this invention, said thermoplastic resin composition is made to contain a filler for the purpose of letting the composition have high strength and high stiffness, and the filler must be the following inorganic particles (a) and/or glass fibers (b).

(a) Inorganic particles with a number average particle size of 10 μm or less, as measured by the laser diffraction method (b) Glass fibers, not less than 60 wt % of which in the thermoplastic resin composition has their fiber lengths kept in a range from 0.1 to 1 mm Only in the case where the filler is said inorganic particles (a) and/or glass fibers (b), the molded article having not only high strength and high stiffness but also excellent surface appearance as a feature of this version of the invention can be obtained. If the filler does not conform to the above-mentioned ranges, the excellent surface appearance as a feature of this version of the invention cannot be obtained.

Examples of said inorganic particles (a) include talc, kaolin, mica, clay, bentonite, sericite, basic magnesium carbonate, aluminum hydroxide, glass flakes, calcium carbonate, silica sand, wollastonite, barium sulfate, glass beads, titanium oxide, etc. Among them, for obtaining a molded article with excellent surface appearance, it is preferred that said inorganic particles are one or more selected from talc, kaolin, mica and calcium carbonate. Furthermore, it is necessary that the number average particle size of the inorganic particles (a) as measured by the laser diffraction method is 10 μm or less. Moreover, 7 μm or less is preferred, and still furthermore, 5 μm or less is most preferred. It is preferred in view of handling during manufacture that the lower limit is 0.1 μm or more.

Furthermore, with regard to the particle size distribution of said inorganic particles (a), it is preferred that too large particles do not exist.

It is preferred that the amount of the inorganic particles (a) is in a range from 1 part by weight to 200 parts by weight per 100 parts by weight in total of the polybutylene terephthalate resin and the polycarbonate resin. A more preferred range is from 10 parts by weight to 100 parts by weight.

Furthermore, in the case where the glass fibers (b) are used as the filler, it is necessary that 60 wt % or more of the glass fibers in the thermoplastic resin composition has fiber lengths kept in a range from 0.1 to 1 mm. In this case, a molded article having not only high strength and high stiffness but also excellent surface appearance can be obtained.

With regard to the fiber length distribution, it is necessary that the fibers with their lengths kept in a range from 0.1 to 1 mm account for 60 wt % or more. Preferred is 70 wt % or more, and more preferred is 80 wt % or more. The preferred range of the fiber length distribution is from 0.1 to 0.8 mm, and a more preferred range is from 0.15 to 0.7 mm.

The glass fiber length distribution in the thermoplastic resin composition is measured as described below. Pellets of the thermoplastic resin composition are placed in a crucible, and heated in an electric furnace at 500° C. for 30 minutes, for being perfectly incinerated and subsequently cooled. Then, an adequate amount of a 1% neutral detergent aqueous solution is added, and the mixture is stirred in an ultrasonic washer for 3 minutes. The stirred solution is placed on a special glass sheet using a glass pipette, and photographed using a stereomicroscope. Then, of the photographed fibers, the fiber lengths of 200 fibers are measured using a digitizer, to obtain the fiber length distribution. As for the fiber length distribution of the glass fibers, if the distribution range is narrow and sharp, not broad, the effect of this version of the invention can be effectively and stably exhibited. For example, if a large amount of glass fibers with short fiber lengths are contained, the obtained molded article decline, for example, in mechanical strength and impact strength. Furthermore, it is not preferred that a large amount of glass fibers with long fiber lengths are contained, since the flowability declines while the surface appearance is degraded.

To keep the fiber lengths of the glass fibers in the molded article in the range of the fiber length distribution specified in this version of the invention, it is preferred that the lengths of the fibers in the thermoplastic resin composition (for example, in the state of pellets) not yet molded are within or somewhat longer than the range specified in this version of the invention. Anyway, in the stage where the glass fibers are mixed, such mixing conditions that the glass fibers are not excessively broken should be taken into account.

It is preferred that the amount of the glass fibers (b) is in a range from 1 part by weight to 200 parts by weight per 100 parts by weight in total of the polybutylene terephthalate resin and the polycarbonate resin.

A preferred method for manufacturing said thermoplastic resin composition is described below. At first, the polybutylene terephthalate resin and the polycarbonate resin are compounded for being once made miscible with each other at a sufficiently high shear stress using, for example, a double-screw extruder, and the mixture is discharged in the form of a gut or sheet from the extruder. Immediately after discharge, it is cooled to obtain a gut or sheet. The obtained gut or sheet has a fixed structure in which the two resins contained as components are miscible with each other, or has a co-continuous structure with a wavelength of concentration fluctuation of 0.1 μm or less in the early stage of spinodal decomposition. More preferred is a fixed structure in which the two resins contained as components are miscible with each other. The gut or sheet is cut to form pellets.

Then, the pellets are compounded again using, for example, a single-screw or double-screw extruder, and a filler is added. In this process, spinodal decomposition is made to progress, to form a co-continuous structure with the wavelength of concentration fluctuation kept in a range from 0.001 to 5 μm or a dispersed structure with the distance between particles kept in a range from 0.001 to 5 μm. In another method also preferably used, the polybutylene terephthalate resin and the polycarbonate resin are mixed and compounded under a sufficient shearing condition, while a filler is added from a side feeder at a region near the tip of the extruder, for causing the spinodal decomposition to further progress in this process, to form a co-continuous structure with the wavelength of concentration fluctuation kept in a range from 0.001 to 5 μm or a dispersed structure with the distance between particles kept in a range from 0.001 to 5 μm.

The thermoplastic resin composition of this version of the invention can be molded by a desired molding method into a desired form. Examples of the molding method include injection molding, extrusion molding, inflation molding, blow molding, etc. Among them, injection molding can be exemplified as a preferred molding method.

The third version of this invention is a molded transparent article comprising a polymer alloy, in which at least polybutylene terephthalate resin and a polycarbonate resin are mixed, wherein said polymer alloy forms a co-continuous structure with a wavelength of concentration fluctuation of 0.001 μm to less than 0.4 μm or a dispersed structure with a distance between particles of 0.001 μm to less than 4 μm on the surface of said molded article, and a 3 mm thick specimen obtained from said molded transparent article and heat-treated at 150° C. for 1 hour has a light transmittance of 80% or more in the visible light with a wavelength of 400 μm.

In this case, the light transmittance in this version of the invention refers to the light transmittance per thickness of 3 mm. In the case where the thickness of the molded article is more than 3 mm, the molded article should be cut to have a thickness of 3.1 mm, and furthermore, with a 3 mm thick spacer set, the molded article should be pressed at 150° C. to a thickness of 3 mm. On the other hand, if the thickness of the molded article is less than 3 mm, the molded article should be laminated with another one to have a thickness of 3 mm or more, and the laminate should be cut to have a thickness of 3.1 mm. Then, with a 3 mm thick spacer set, the laminate should be pressed at 150° C. to obtain a molded article with a thickness of 3 mm.

The molded article of this version of the invention is excellent in moldability, chemicals resistance and transparency. Since the polybutylene terephthalate resin and the polycarbonate resin have a structure in said range, high molding properties and chemicals resistance can be exhibited. Meanwhile, in general, in the case where polybutylene terephthalate resin and a polycarbonate resin form such a co-continuous structure or a dispersed structure as described above, the transparency after heating tends to become poor. That is, since heating causes crystal growth in the polybutylene terephthalate resin, the transparency is likely to be poor. However, since the molded article of this version of the invention has a structure in which a wavelength of concentration fluctuation or a distance between particles of less than 0.4 μm, the crystals of the polybutylene terephthalate resin become fine to inhibit the growth into coarse spherulites. Therefore, since the crystals of the polybutylene terephthalate resin grow only to a size smaller than the wavelength of visible light, a highly transparent molded article can be obtained after heating.

Furthermore, to obtain a molded article with more stable transparency after having been exposed to high temperature, it is preferred to control for forming a co-continuous structure with the wavelength of concentration fluctuation kept in a range from 0.002 to 0.3 μm or a dispersed structure with the distance between particles kept in a range from 0.002 to 0.3 μm. It is more preferred to control for forming a co-continuous structure with the wavelength of concentration fluctuation kept in a range from 0.003 to 0.2 μm or a dispersed structure with the distance between particles kept in a range from 0.003 to 0.2 μm.

The polybutylene terephthalate resin used in this invention is the same as that described in the section for the second version of the invention, and furthermore, the polycarbonate resin is the same as that described in the section for the first version of the invention.

The added amounts of the polybutylene terephthalate resin and the polycarbonate resin are not especially limited, but it is preferred that the ratio of the added amounts of the polybutylene terephthalate resin and the polycarbonate resin is in a range from 10/90 (ratio by weight) to 90/10 (ratio by weight) as polybutylene terephthalate resin/polycarbonate resin. More preferred is a range from 15/85 to 85/15 (ratio by weight).

Furthermore, it is preferred to add an ultraviolet light absorber to said molded article, for the purpose of improving weather resistance. Examples of the ultraviolet light absorber include those based on benzotriazole, benzophenone, benzoate, cyanoacrylate, etc. Among them, benzotriazole-based ultraviolet light absorbers and benzoate-based ultraviolet light absorbers are preferred. The benzotriazole-based light absorbers include 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(5-methyl-2-hydroxyphenyl)benzotriazole, 2-(3,5-di-t-butyl-2-hydroxyphenyl)benzotriazole, 2-(2-hydroxy-5-t-octylphenyl)benzotriazole, 2-(2-hydroxy-3,5-di-5-amylphenyl)benzotriazole, etc. Furthermore, the benzoate-based light absorbers include, for example, 2,4-di-t-butylphenyl-3,5-di-t-butyl-4-hydroxybenzoate, hexadecyl-3,5-di-t-buyl-4-hydroxybenzoate, etc. Particularly, for example, ChemiSorb (registered trademark)" 79 (Chemipro Kasei Kaisha, Ltd.), "Tinuvin (registered trademark)" 234 (Ciba Specialty Chemicals), "Adekastab (registered trademark)" LA31 (Asahi Denka Co., Ltd.), and "Tinuvin (registered trademark)" 1577 (Ciba Specialty Chemicals) can be enumerated as preferred commercially available products. It is preferred that the added amount of the ultraviolet light absorber is in a range from 0.05 part by weight to 10 parts by weight per 100 parts by weight in total of the polybutylene terephthalate resin and the polycarbonate resin.

Furthermore, it is preferred that a third component such as a block copolymer, graft copolymer or random copolymer respectively containing the components constituting the molded article is added to said molded article, for such reasons that the free energy at the interface between the separated phases can be lowered and that the wavelength of concentration fluctuation in the co-continuous structure or the distance between particles in the dispersed structure can be easily controlled. The third component such as a block copolymer, graft copolymer or random copolymer containing the components constituting the molded article is the same as that described in the section for the first version of the invention.

Moreover, the molded article of this invention can also further contain other thermoplastic resins and thermosetting resins to such an extent that the structure of this invention is not impaired. The thermoplastic resins and thermosetting resins are the same as those enumerated in the section for the first version of the invention.

These other thermoplastic resins and thermosetting resins can be mixed at any desired stage while the molded article of this version of the invention is manufactured. For example, a method of adding them simultaneously when the polybutylene terephthalate resin and the polycarbonate resin are added, or a method of adding them after compounding the polybutylene terephthalate resin and the polycarbonate resin, or a method of at first adding them to either of the polybutylene terephthalate resin and the polycarbonate resin, melt-kneading the mixture and adding the other resin can be employed.

Meanwhile, the molded article of this invention can further contain various additives to such an extent that the object of this invention is not impaired. These additives are the same as those enumerated in the section for the first version of the invention.

These additives can be mixed at any desired stage while the molded article of this invention is manufactured. For example, a method of adding them simultaneously when the polybutylene terephthalate resin and the polycarbonate resin are added, or a method of adding them after compounding the polybutylene terephthalate resin and the polycarbonate resin, or a method of at first adding them to either of the polybutylene terephthalate resin and the polycarbonate resin, compounding the mixture and adding the other resin can be employed.

A preferred method for manufacturing the molded article of this version of the invention is described below. At first, polybutylene terephthalate resin and a polycarbonate resin are compounded for being once made miscible with each other at a sufficiently high shear stress using, for example, a double-screw extruder, and the mixture is discharged from the extruder and immediately cooled and cut to obtain pellets. The obtained pellets have a fixed structure in which the two resins contained as components are miscible with each other or pellets having a co-continuous structure with a wavelength of concentration fluctuation of 0.1 μm or less in the early stage of spinodal decomposition. More preferred is a fixed structure in which two resins contained as components are miscible with each other. The pellets are molded to let the spinodal decomposition progress in the process of molding, for forming a co-continuous structure with the wavelength of concentration fluctuation kept in a range from 0.001 μm to less than 0.4 μm or a dispersed structure with the distance between particles kept in a range from 0.001 μm to less than 0.4 μm, and the structure is fixed.

The molded article of this invention can be obtained using any of various molding methods. Preferably, for example, an injection molding method, film forming method, sheet forming method, inflation molding method and blow molding method can be used. Especially preferably the molded article in this invention is, for example, an injection-molded article, film or sheet obtained by an injection molding method, film forming method or sheet forming method. Furthermore, the molded articles obtained by post-processing, for example, laminating films or sheets, forming a corrugated board or coating the surface are also preferred.

In an injection molding method, said pellets are injection-molded, to let the spinodal decomposition progress in the process of injection molding, for forming a co-continuous structure with the wavelength of concentration fluctuation kept in a range from 0.001 μm to less than 0.4 μm or a dispersed structure with the distance between particles kept in a range from 0.001 μm to less than 0.4 μm on the surface of the molded article, when the structure is fixed to obtain an injection-molded article.

In a film forming method or sheet forming method, said pellets are extrusion-molded, to let the spinodal decomposition progress in the process of extrusion molding, and the material is discharged from a T die. After discharge, it is cooled to fix the structure, for forming a film or sheet having a co-continuous structure with the wavelength of concentration fluctuation kept in a range from 0.001 μm to less than 0.4 μm or a dispersed structure with the distance between particles kept in a range from 0.001 μm to less than 0.4 μm on the surface of the film or sheet. More particularly, for example, there is a method of cooling and solidifying using a casting drum after discharging, a polishing method or calendering method of molding between two rolls after discharging, though this version of the invention is not limited to these methods. For keeping the molten resin in contact with the casting drum when the molten resin is cast on the casting drum, for example, a method of applying static electricity, a method of using an air knife or a method of using a contact drum in opposite to the casting drum can also be used. In the case where the molten resin is cast on a casting drum, it is preferred to install the casting drum directly below the discharge port for quick cooling, since the polybutylene terephthalate can be finely crystallized.

Moreover, the obtained film can also be stretched. The stretching method is not especially limited, and either sequential biaxial stretching or simultaneous biaxial stretching can be used. Furthermore, a stretching ratio in a range from 2 to 8 times and a stretching speed in a range from 500 to 5000%/min can be preferably used. A method in which the heat treatment during stretching is performed at a temperature higher than the lowest temperature among the glass transition temperatures of the individual resins used as the components constituting the film or sheet, i.e., at higher than the glass transition temperature of polybutylene terephthalate resin, is usually preferably used. In the case where the polybutylene terephthalate resin and the polycarbonate resin are miscible with each other and have a single glass transition temperature, or in the case where the glass transition temperature of the polymer alloy is between the glass transition temperatures of the polybutylene terephthalate resin and the polycarbonate resin in a state where phase decomposition progresses, it is more preferred to heat-treat at a temperature higher than the lowest temperature of the glass transition temperatures in the polymer alloy. Furthermore, it is preferred that the heat treatment temperature is lower than the heating crystallization temperature of the polybutylene terephthalate resin, since the inhibition of stretching due to the crystallization of the crystalline resin is less likely to occur. It is preferred that the stretched film obtained like this is further heat-treated to ease the strain remaining due to stretching, for use as a film with a stabilized structure. In a usually preferably used method, the heat treatment for stabilization is performed at a temperature higher than the lowest temperature among the glass transition temperatures of the individual resins used as the components constituting the film or sheet. In the case where the glass transition temperature of the polymer alloy is between the glass transition temperatures of the polybutylene terephthalate and the polycarbonate resin in a state where phase separation progresses, it is preferred that the heat treatment is performed at a temperature higher than the lowest temperature of the glass transition temperatures in the polymer alloy. Furthermore, if the stretched film can have a longer wavelength of concentration fluctuation or a longer distance between particles owing to stretching. In the stretched film, it is preferred that the polybutylene terephthalate resin and the polycarbonate resin have a co-continuous structure with a wavelength of concentration fluctuation of 0.001 µm to less than 0.4 µm or a dispersed structure with a distance between particles of 0.001 µm to less than 0.4 µm, since excellent transparency can be obtained.

The fourth version of this invention is a molded article with a hollow portion manufactured by molding a polymer alloy, in which at least polybutylene terephthalate resin and a polycarbonate resin are mixed, wherein the polymer alloy constituting said molded article forms a co-continuous structure with a wavelength of concentration fluctuation of 0.001 to 5 µm or a dispersed structure with a distance between particles of 0.001 to 5 µm on the surface of the molded article.

In order to obtain a molded hollow article with a more uniform wall thickness, it is preferred to control for forming a co-continuous structure with the wavelength of concentration fluctuation kept in a range from 0.002 to 1 µm or a dispersed structure with the distance between particles kept in a range from 0.002 to 1 µm, and furthermore it is more preferred to control for forming a co-continuous structure with the wavelength of concentration fluctuation kept in a range from 0.003 to 0.5 µm or a dispersed structure with the distance between particles kept in a range from 0.003 to 0.5 µm. It is most preferred to control for forming a co-continuous structure with the wavelength of concentration fluctuation kept in a range from 0.003 to 0.3 µm or a dispersed structure with the distance between particles kept in a range from 0.003 to 0.3 µm. In this invention, because of such a fine phase structure, a molded hollow article with a uniform wall thickness can be obtained.

The polybutylene terephthalate resin used in this invention is the same as described in the section for the second version of the invention, and the polycarbonate resin used in the polymer alloy of this invention is the same as that described in the section for the first version of the invention.

The added amounts of the polybutylene terephthalate resin and the polycarbonate resin are not especially limited, but it is preferred that the ratio of the added amounts of the polybutylene terephthalate resin and the polycarbonate resin is in a range from 10/90 to 90/10 (ratio by weight) as polybutylene terephthalate resin/polycarbonate resin, and more preferred is a range from 15/85 to 85/15 (ratio by weight).

Furthermore, it is preferred to add a third component such as a block copolymer, graft copolymer or random copolymer respectively containing the components constituting the molded article to the above-mentioned molded article, for such reasons that the free energy at the interface between the separated phases can be lowered and that the wavelength of concentration fluctuation in the co-continuous structure or the distance between particles in the dispersed structure can be easily controlled. In this case, since the third component such as a copolymer is usually distributed into the respective phases of the two resins (the polybutylene terephthalate resin and the polycarbonate resin in this version of the invention) contained as components excluding the third component, the polymer alloy obtained can be handled like the polymer alloy consisting of two resins contained as components.

Moreover, said molded article can also further contain other thermoplastic resins and thermosetting resins to such an extent that the structure of this invention is not impaired. These thermoplastic resins and thermosetting resins are also the same as those enumerated in the section for the first version of the invention.

These other thermoplastic resins and thermosetting resins can be mixed at any desired stage while the molded article of this version of the invention is manufactured. For example, a method of adding them simultaneously when the polybutylene terephthalate resin and the polycarbonate resin are added, or a method of adding them after compounding the polybutylene terephthalate resin and the polycarbonate resin, or a method of at first adding them to either of the polybutylene terephthalate resin and the polycarbonate resin, compounding the mixture and adding the other resin can be employed.

Meanwhile, the molded article can further contain various additives to such an extent that the object of this invention is not impaired. These additives are the same as those enumerated in the section for the first version of the invention.

These additives can be mixed at any desired stage while the molded article of this invention is manufactured. For example, a method of adding them simultaneously when the polybutylene terephthalate resin and the polycarbonate resin are added, or a method of adding them after compounding the polybutylene terephthalate resin and the polycarbonate resin, or a method of at first adding them to either of the polybutylene terephthalate resin and the polycarbonate resin, compounding the mixture and adding the other resin can be employed.

A preferred method for manufacturing the molded article of this invention is described below. At first, polybutylene terephthalate resin and a polycarbonate resin are compounded for being once made miscible with each other at a sufficiently high shear stress using, for example, a double-screw extruder, and the mixture is discharged in the form of a gut or sheet from the extruder, the gut or sheet being immediately cooled and cut into pellets. The obtained pellets have a fixed structure in which the two resins contained as components are miscible with each other or have a co-continuous structure with a wavelength of concentration fluctuation of 0.1 µm or less in the early stage of spinodal decomposition. More preferred is a fixed structure in which two resins contained as components are miscible with each other. The pellets are molded to let the spinodal decomposition further progress in the process of molding, for forming a co-continuous structure with the wavelength of concentration fluctuation kept in a range from 0.001 to 0.5 µm or a dispersed structure with the distance between particles kept in a range from 0.001 to 0.5 µm, and the structure is fixed.

The molded article of this invention is a molded article having a hollow portion. Such a molded hollow article can be preferably obtained using a molding method of injecting any of various media such as gases and liquids into a molten resin. A preferred molding method is a gas assisted molding method or injection blow molding method.

A gas assisted molding method refers to a molding method comprising the steps of melting the pellets comprising said polymer alloy, injecting the molten resin into a mold cavity for filling it, and injecting a pressure gas such as nitrogen using a nozzle or needle into the molten resin during the injection of the molten resin or after the injection filling of the molten resin. The gas assisted molding method can be performed according to an ordinary method using an ordinary gas assisted molding machine. For example, it is preferred that the injected amount of the molten resin is in a range from 30 to 80% of the mold cavity volume, and a more preferred range is from 50 to 70%. Furthermore, the gas injection pressure can be selected in relation, for example, with the melt viscosity of the polymer alloy, and for example, a preferred injection pressure is in a range from 5 to 500 kg/cm². In the injection filling step, the amount of the molten resin injected for filling depends on the volume of the hollow portion of the molded article and is smaller than the cavity volume. In this case, if the resin to be injected is unevenly injected into the mold cavity to cause flow deformation, for example, hesitation marks are formed on the molded article to degrade the appearance quality. On the contrary, if the above-mentioned pellets are used for injection filling, a fine phase structure is formed due to the spinodal decomposition as described before. Probably because of the rheological properties attributable to excellent regularity, the flow deformation of the molten resin is inhibited, and injection in a uniform shape can be achieved in the mold cavity. Thus, a molded hollow article uniform in the wall thickness, decreased in the formation of multi-wrinkled hesitation marks or the like, uniform on the surface and excellent in appearance quality can be obtained.

An injection blow molding method refers to a method comprising the steps of at first molding a preform as a model of the molded article by injection molding, and blowing air into it. In this case, if heterogeneous crystallization is caused due to the heterogeneity of the resin used in the preform molding step, it is difficult to stably inflate the preform in the subsequent blowing step. On the contrary, if said pellets are used for preform molding, a fine phase structure can be formed due to the spinodal decomposition as described before. Since the heterogeneity of crystallization decreases in the preform due to excellent regularity, the preform can be stably inflated in the subsequent blowing step, and a molded hollow article uniform on the surface and excellent in appearance quality can be obtained.

The fifth version of this invention is a molded article with a weld zone in which a molded article manufactured by molding a polymer alloy, in which at least polybutylene terephthalate resin and a polycarbonate resin are mixed, is welded to another member, wherein said polymer alloy forms a co-continuous structure with a wavelength of concentration fluctuation of 0.001 to 5 µm or a dispersed structure with a distance between particles of 0.001 to 5 µm on the surface of the non-weld zone comprising said polymer alloy in said molded article.

In the molded article of this version of the invention, a molded article containing polybutylene terephthalate resin and a polycarbonate resin, in which the polybutylene terephthalate resin and the polycarbonate resin form a co-continuous structure with a wavelength of concentration fluctuation of 0.001 to 5 µm or a dispersed structure with a distance between particles of 0.001 to 5 µm, is used and welded to another member. In this case, the other member can also be comprising the same alloy as that of said molded article or can be comprising a different resin or resin composition. However, the former is preferred since an excellent welding strength can be obtained. Furthermore, instead of the other member, two or more other members can also be used. In the case where a molded article with such a specific structure is welded, a molded composite article with excellent welding strength can be obtained. Probably because of the rheological properties due to excellent regularity, it is considered that the welding behavior improves stably.

For obtaining a molded composite article with a more excellent welding strength, it is preferred to control for forming a co-continuous structure with the wavelength of concentration fluctuation kept in a range from 0.002 to 1 µm or a dispersed structure with the distance between particles kept in a range from 0.002 to 1 µm on the surface of the non-weld zone of the molded composite article, and it is more preferred to control for forming a co-continuous structure with the wavelength of concentration fluctuation kept in a range from 0.003 to 0.5 µm or a dispersed structure with the distance between particles kept in a range from 0.003 to 0.5 µm. It is most preferred to control for forming a co-continuous structure with the wavelength of concentration fluctuation kept in a range from 0.003 to 0.3 µm or a dispersed structure with the distance between particles kept in a range from 0.003 to 0.3 µm.

Meanwhile, in this invention, the wavelength of concentration fluctuation (the distance between particles) of the polymer alloy constituting the molded composite article refers to a value measured on the surface of the non-weld zone. The reasons are that it is difficult to measure the wavelength of concentration fluctuation (the distance between particles) of the polymer alloy directly on the weld zone after welding, and that the phase structure on the surface of the zone to be welded before welding is substantially the same as that on the surface of the non-weld zone.

The polybutylene terephthalate resin used in this version of this invention is the same as that described in the section for the second version of the invention, and the polycarbonate resin used in this version of the invention is the same as that described in the section for the first version of the invention.

The added amounts of the polybutylene terephthalate resin and the polycarbonate resin are not especially limited. It is preferred that the ratio of the added amounts of the polybutylene terephthalate resin and the polycarbonate resin is in a range from 10/90 to 90/10 (ratio by weight) as polybutylene terephthalate resin/polycarbonate resin and a more preferred range is from 15/85 to 85/15 (ratio by weight).

Furthermore, it is preferred to add a third component such as a block copolymer, graft copolymer or random copolymer respectively containing the components constituting the molded article to the above-mentioned molded article, for such reasons that the free energy at the interface between the separated phases can be lowered and that the wavelength of concentration fluctuation in the co-continuous structure or the distance between particles in the dispersed structure can be easily controlled. In this case, since the third component such as a copolymer is usually distributed into the respective phases of the two resins (the polybutylene terephthalate resin and the polycarbonate resin in this version of the invention) contained as components excluding the third component, the polymer alloy obtained can be handled like the polymer alloy consisting of two resins contained as components.

Moreover, the above-mentioned molded article can also further contain other thermoplastic resins and thermosetting resins to such an extent that the structure of this invention is not impaired. These thermoplastic resins and thermosetting resins are the same as those enumerated in the section for the first version of the invention.

These other thermoplastic resins and thermosetting resins can be mixed at any desired stage while the molded article of this invention is manufactured. For example, a method of adding them simultaneously when the polybutylene terephthalate resin and the polycarbonate resin are added, or a method of adding them after compounding the polybutylene terephthalate resin and the polycarbonate resin, or a method of at first adding them to either of the polybutylene terephthalate resin and the polycarbonate resin, compounding the mixture and adding the other resin can be employed.

Meanwhile, the molded article of this invention can further contain various additives to such an extent that the object of this invention is not impaired. These additives are the same as those enumerated in the section for the first version of the invention.

A preferred method for manufacturing the molded article of this invention is described below. At first, polybutylene terephthalate resin and a polycarbonate resin are compounded for being once made miscible with each other at a sufficiently high shear stress using, for example, a double-screw extruder, and the mixture is discharged in the form of a gut or sheet from the extruder, the gut or sheet being immediately cooled and cut into pellets. The obtained pellets have a fixed structure in which the two resins contained as components are miscible with each other or have a co-continuous structure with a wavelength of concentration fluctuation of 0.1 µm or less in the early stage of spinodal decomposition. More preferred is a fixed structure in which two resins contained as components are miscible with each other. The pellets are molded to let the spinodal decomposition further progress in the process of molding, for example, injection molding, for forming a co-continuous structure with the wavelength of concentration fluctuation kept in a range from 0.001 to 0.5 µm or a dispersed structure with the distance between particles kept in a range from 0.001 to 0.5 µm, and the structure is fixed.

Then, the molded article is welded to another member, to obtain a molded composite article.

The molded composite article of this invention can be obtained by using any of various welding methods. Preferred welding methods include a laser welding method, vibration welding method, thermal welding method and ultrasonic welding method.

A laser welding method refers to a method in which a specimen made of a material capable of transmitting a laser beam, to be placed above for laser welding, is overlaid on a specimen made of a material capable of absorbing the laser beam, to be placed below for laser welding, for irradiation with a laser beam from above. Usually, laser irradiation is performed along the laser welding track. The laser welding conditions are not especially limited, but for example, an output in a range from 10 to 50 W and a laser scanning velocity in a range from 1 to 50 mm/sec can be exemplified as preferred laser welding conditions. Moreover, the molded article of this invention not only is effective as a member capable of transmitting a laser beam but also can be effectively used as a member capable of absorbing a laser beam if carbon black or the like is mixed.

A vibration welding method refers to a method in which while the surfaces to be bonded to each other are pressurized at about 0.1 to about 0.6 MPa, vibration with a vibration amplitude of about 0.5 to about 2.0 mm is given at a frequency of about 100 Hz, for fusion bonding using the frictional heat generated.

A thermal welding method refers to a method comprising the step of bringing the regions to be welded to each other into contact with heated hot plates for fusing them, removing the hot plates, and holding the regions to be welded in a butt position, for thermal welding.

An ultrasonic welding method refers to a method in which ultrasonic vibration is used to give vibration energy to the resins for fusion bonding using the property that the vibration energy is converted into heat energy for heat generation in the resins.

This invention is described below based on examples.

In the examples, the following raw materials were used.

PBT-1: Polybutylene terephthalate ("Toraycon (registered trademark)" 1050S, glass transition temperature 32° C., crystal melting temperature 220° C., produced by Toray Industries, Inc.)

PBT-2: Polybutylene terephthalate ("Toraycon (registered trademark)" 1200S, glass transition temperature 32° C., crystal melting temperature 220° C., produced by Toray Industries, Inc.)

PBT-3: Polybutylene terephthalate ("Toraycon (registered trademark)" 1100S, glass transition temperature 32° C., crystal melting temperature 220° C., produced by Toray Industries, Inc.)

PC-1: Polycarbonate resin ("Jupilon (registered trademark)" E2000, glass transition temperature 151° C., specific viscosity of the solution with 0.7 g dissolved in 100 ml of methylene chloride, measured at 20° C., 1.18, produced by Mitsubishi Engineering Plastic Co., Ltd.)

PC-2: Polycarbonate resin ("Jupilon (registered trademark)" S2000, glass transition temperature 151° C., specific viscosity of the solution with 0.7 g dissolved in 100 ml of methylene chloride, measured at 20° C., 0.78, produced by Mitsubishi Engineering Plastic Co., Ltd.)

PC-3: Polycarbonate resin ("Toughlon (registered trademark)" A1900, glass transition temperature 151° C., specific viscosity of the solution with 0.7 g dissolved in 100 ml of methylene chloride, measured at 20° C., 0.48, produced by Idemitsu Petrochemical Co., Ltd.)

PC-4: Polycarbonate resin ("Jupilon (registered trade mark)" H4000, glass transition temperature 151° C., specific viscosity of the solution with 0.7 g dissolved in 100 ml of methylene chloride, measured at 20° C., 0.44, produced by Mitsubishi Engineering Plastic Co., Ltd.)

Rubbery polymer 1: Core-shell polymer ("KANEACE (registered trademark)" FM511, produced by Kaneka Corp.)

Rubbery polymer 2: Core-shell polymer ("METABLEN (registered trademark)" S2001, produced by Mitsubishi Rayon Co., Ltd.)

Inactive particles: wet silica with an average particle size of 2.5 µm (secondary size)

Releasing agent 1: Ethylene glycol montanic ester ("Licowax E, produced by Clariant (Japan) K.K.)

Releasing agent 2: Polyethylene ("HIZEX (registered trademark)" 7000F, produced by Mitsui Chemicals, Inc.)

Talc 1: PKP80 (produced by Fuji Talc Kogyo) talc passing a 200-mesh sieve, number average particle size 4.5 µm Talc 2: PKP80 (produced by Fuji Talc Kogyo) talc passing a 150-mesh sieve, number average particle size 10.2 µm Talc 3: LMS300 (produced by Fuji Talc Kogyo) talc with a number average particle size of 4.5 µm Glass fibers: Glass fibers with a glass fiber diameter of 9 μm and a length of 3 mm.

The particle size of talc was measured by the laser diffraction method under the following conditions and expressed by the obtained median size (number average particle size).
Measuring Instrument: SALD2000J produced by Shimadzu Corp.
Range of measured particle sizes: 0.1 to 100 μm Ultraviolet light absorber: 2-(2H-benzotriazole-2-yl)-4,6-bis(1-methyl-1-phenylethyl)phenol, "Tinuvin (registered trademark)" 234, produced by Ciba Specialty Chemicals In the examples and comparative examples, the following evaluation methods were used.

(1) Manufacture of Specimens for Evaluation

Obtained pellets were fed into an injection molding machine (PS-60E9DSE) produced by Nissei Plastic Industrial Co., Ltd., set at 240° C.-250° C.-260° C.-260° C. from below the hopper toward the tip, and ⅛" (3.2 mm) thick Izod impact specimens with a mold notch were manufactured at a mold temperature of 80° C. in molding cycles consisting of 10-second dwell time and 30-second cooling time.

(2) Measurement of Absorption Peak Intensities in Infrared Absorption Spectrum

For the discharged gut, pellet surface, injection-molded article surface or sheet surface obtained in a example or comparative example, Spectrum One Fourier-transform absorption ATR instrument produced by Perkin Elmer was used to measure the infrared absorption spectrum at a resolution of 4 cm$^{-1}$ four times, to obtain the peak intensity of the absorption appearing in a range of 2933±5 cm$^{-1}$ and the peak intensity of the absorption appearing in a range of 2965±5 cm$^{1}$. The infrared absorption peak intensity in this case was calculated by subtracting the intensity value on the straight base line corresponding to the peak position from the intensity value at the peak position. The straight base line is the straight line connecting the intensity of 3200 cm$^{-1}$ and the intensity of 2700 cm$^{-1}$.

(3) Evaluation of Phase Structure i) Observation Using an Electron Microscope

In a discharged gut, pellet, injection-molded article or sheet, the polycarbonate resin was dyed using the iodine dyeing method, and a very thin section was cut out of it as a sample using an ultra-microtome. The section was magnified 100,000-fold under Model H-7100 Transmission Electron Microscope produced by Hitachi, Ltd., to observe the phase structure. When a co-continuous structure was observed, the following measurement ii) was performed to decide the wavelength of concentration fluctuation.

ii) The wavelength of concentration fluctuation in the co-continuous structure was measured by means of small-angle X-ray scattering. The X-ray generator used was RU-200 produced by Rigaku Corporation, and CuKα radiation was used as a radiation source. A scattering photograph was taken with an output of 50 kV/150 mA, a slit diameter of 0.5 mm and a camera radius of 405 mm for an exposure time of 120 minutes using Kodak DEF-5 film. From the peak position (θm) in small-angle X-ray scattering, the wavelength of concentration fluctuation (Λm) was calculated from the following formula.

$$\Lambda m = (\lambda/2)/\sin(\theta m/2)$$

(4) Izod Impact Test

A ⅛" (3.2 mm) thick Izod impact specimen with a mold notch was used for measuring the Izod impact value according to ASTM D638.

EXAMPLES 1 TO 6

The raw materials listed for each example in Table 1 were fed into a two-screw extruder with the screws arranged to have two kneading zones (PCM-30 produced by Ikegai Kogyo) set at an extrusion temperature of 250° C. and a screw speed of 300 rpm, and the gut discharged from its die was quickly cooled in icy water. The gut of every example was transparent, and when the gut was observed according to the above-mentioned evaluation method, it was confirmed that every sample was made miscible without structural elements of 0.001 μm or more. For each of the guts, the peak intensity of the absorption appearing in a range of 2933±5 cm$^{-1}$ and the peak intensity of the absorption appearing in a range of 2965±5 cm$^{-1}$ were obtained, and the infrared absorption peak intensity ratio calculated from the following formula 1 is shown in Table 1.

Infrared absorption peak intensity ratio=$I(2933\ cm^{-1})/I(2965\ cm^{-1})$ [Formula 1]

I (2933 cm$^{-1}$): Peak intensity of the infrared absorption appearing in a range of 2933±5 cm$^{-1}$ in said composition I (2965 cm$^{-1}$): Peak intensity of the infrared absorption appearing in a range of 2965±5 cm$^{-1}$ in said composition Then, each gut discharged from the die was passed through a cooling bath filled with water kept at 10° C., taking 15 seconds, for being quickly cooled to fix the structure and it was cut using a strand cutter into pellets. All the pellets of the respective examples were transparent, and observed according to the above-mentioned evaluation method. In Examples 1 to 3, 5 and 6, since no structural elements of 0.001 μm or more were observed, it was confirmed that they were made miscible. In Example 4, it was confirmed that a co-continuous structure of 0.07 μm was formed. Furthermore, for the pellets of each example, the peak intensity of the absorption appearing in a range of 2933±5 cm$^{-1}$ and the peak intensity of the absorption appearing in a range of 1965±5 cm$^{-1}$ were obtained, and the infrared absorption peak intensity ratio calculated from the following formula 2 is shown in Table 1.

Infrared absorption peak intensity ratio=$Ip(2933\ cm^{-1})/Ip(2965\ cm^{-1})$ [Formula 2]

Ip(2933 cm$^{-1}$): Peak intensity of the infrared absorption appearing in a range of 2933±5 cm$^{-1}$ on the surface of the pellet Ip(2965 cm$^{-1}$): Peak intensity of the infrared absorption appearing in a range of 2965±5 cm$^{-1}$ on the surface of the pellet The obtained pellets were used to mold ⅛" (3.2 mm) thick Izod impact specimens with a mold notch according to the above-mentioned manufacturing method. The Izod impact specimens were used to perform Izod impact tests at 23° C. according to ASTM D638. The results are shown in Table 1.

From each of the molded articles produced by molding under the above-mentioned injection molding conditions, a very thin section was cut out, and the state of its structure was observed on its transmission electron microscope photograph as described for the above-mentioned pellets. On the electron microscope photograph, a co-continuous structure in which the black dyed polycarbonate phase and the white polybutylene terephthalate phase formed continuous phases respectively was observed.

Furthermore, the wavelength of concentration fluctuation in the above-mentioned co-continuous structure was measured by means of small-angle X-ray scattering according to the above-mentioned evaluation method. The result is shown in Table 1.

Moreover, the peak intensity of the absorption appearing in a range of 2933±5 cm$^{-1}$ and the peak intensity of the absorption appearing in a range of 2965±5 cm$^{-1}$ of each of the Izod impact specimens were obtained, and the infrared absorption peak intensity ratio calculated from the following formula 4 is shown in Table 1.

Infrared absorption peak intensity ratio=$Ii(2933\ cm^{-1})/Ii(2965\ cm^{-1})$ [Formula 4]

$Ii(2933\ cm^{-1})$: Peak intensity of the infrared absorption appearing in a range of $2933\pm5\ cm^{-1}$ on the surface of the injection-molded article these samples, pellets and molded articles were manufactured as described for Examples 1 to 6 and were observed under a microscope, and infrared absorption peak intensity ratios were obtained. The results are shown in Table 1. Meanwhile, the wavelength of concentration fluctuation of the sample of Comparative Example 1 was obtained from its electron microscope photograph. Furthermore, molding and evaluation were performed as described for Examples 1 to 6, and the results are shown in Table 1.

TABLE 1

|  |  |  | Example 1 | Example 2 | Example 3 | Example 4 | Example 5 | Example 6 | Comparative Example 1 | Comparative Example 2 |
|---|---|---|---|---|---|---|---|---|---|---|
| Chemical composition | PC-1 | parts by weight | 100 | 100 | 100 | 100 |  |  | 100 | 100 |
|  | PC-3 | parts by weight |  |  |  |  | 100 |  |  |  |
|  | PC-4 | parts by weight |  |  |  |  |  | 100 |  |  |
|  | PBT-1 | parts by weight | 40 | 100 | 100 | 230 | 100 | 100 | 100 | 100 |
|  | Releasing agent 1 | parts by weight | 0.2 |  | 0.2 | 0.2 | 0.2 | 0.2 | 0.2 | 0.2 |
| Kneading conditions | Temperature | ° C. | 250 | 250 | 250 | 250 | 250 | 250 | 250 | 250 |
|  | Screw speed | rpm | 300 | 300 | 300 | 300 | 300 | 300 | 100 | 200 |
| Discharged gut | Structure |  | Miscible | Miscible | Miscible | Miscible | Miscible | Miscible | Dispersed | Miscible |
|  | Infrared absorption peak intensity ratio 1* |  | 0.47 | 0.47 | 0.47 | 0.47 | 0.44 | 0.43 | 0.35 | 0.39 |
|  | Wavelength of concentration fluctuation or distance between particles | μm | — | — | — | — | — | — | 1.2 | — |
| Pellets | Structure |  | Miscible | Miscible | Miscible | Co-continuous | Miscible | Miscible | Dispersed | Miscible |
|  | Infrared absorption peak intensity ratio 2* |  | 0.48 | 0.47 | 0.47 | 0.47 | 0.44 | 0.43 | 0.35 | 0.39 |
|  | Wavelength of concentration fluctuation or distance between particles | μm | — | — | — | 0.07 | — | — | 1.5 | — |
| Molded article | Molding method |  | Injection molding | Injection molding | Injection molding | Injection molding | Injection molding | Injection molding | Injection molding | Injection molding |
|  | Structure |  | Co-continuous | Co-continuous | Co-continuous | Co-continuous | Co-continuous | Co-continuous | Dispersed | Co-continuous |
|  | Infrared absorption peak intensity ratio 3* |  | 0.57 | 0.57 | 0.56 | 0.52 | 0.44 | 0.43 | 0.36 | 0.40 |
|  | Wavelength of concentration fluctuation or distance between particles | μm | 0.08 | 0.1 | 0.1 | 0.12 | 0.1 | 0.1 | 1.5 | 0.1 |
|  | Izod impact strength (23° C.) | J/m | 450 | 580 | 580 | 750 | 220 | 190 | 60 | 100 |

1* $I(2933\ cm^{-1})/I(2965\ cm^{-1})$
2* $I_n(2933\ cm-1)/I_n(2965\ cm-1)$
3* $I_f(2933\ cm-1)/I_f(2965\ cm-1)$ $Ii(2965\ cm^{-1})$: Peak intensity of the infrared absorption appearing in a range of $2965\pm5\ cm^{-1}$ on the surface of the injection-molded article

COMPARATIVE EXAMPLES 1 AND 2

Compounding was performed as described for Examples 1 to 6, except that the screw speed was set at 100 rpm or 200 rpm. The gut of Comparative Example 1 was opaque, and the gut of Comparative Example 2 was transparent. Also from

EXAMPLES 7 TO 11

The raw materials listed for each example in Table 2 were compounded as described for Examples 1 to 6, to obtain pellets. Furthermore, the obtained pellets were fed into a single-screw extruder (40 mm diameter) with a T die at the tip portion set at an extrusion temperature of 250° C., and formed into a film. For the film formation, a specular casting drum of hard chromium kept at a temperature of 50° C. was installed below the T die, and the resin discharged from the mouthpiece of the T die was cast onto the casting drum and further guided around a second drum kept at a temperature of 50° C., being passed between rolls set at 5 rpm to be constant in the winding speed and wound around a winding roll, to obtain a film. The films obtained had a thickness of 0.1 mm. Furthermore, all the films obtained like this were transparent. They were observed according to the above-mentioned evaluation method, and it was confirmed that all the samples had a co-continuous structure. Furthermore, the wavelength of concentration fluctuation of each sample was measured by means of small-angle X-ray scattering. The results are shown in Table 2. Furthermore, for each of the films, the peak intensity of the absorption appearing in a range of 2933±5 cm$^{-1}$ and the peak intensity of the absorption appearing in a range of 1965±5 cm$^{-1}$ were obtained, and the infrared absorption peak intensity ratio calculated from the following formula 3 is shown in Table 2.

Infrared absorption peak intensity ratio=$I\!f$(2933 cm$^{-1}$)/$I\!f$(2965 cm$^{-1}$)   [Formula 3]

$I\!f$(2933 cm$^{-1}$): Peak intensity of the infrared absorption appearing in a range of 2933±5 cm$^{-1}$ on the surface of the film
$I\!f$ (2965 cm$^{1}$): Peak intensity of the infrared absorption appearing in a range of 2965±5 cm$^{-1}$ on the surface of the film Then, from each of the films obtained as described above, a 50 mm long, 10 mm wide and 0.1 mm thick film was cut out, and at an inter-chuck distance of 20 mm and at a tensile speed of 10 mm/min, the tensile strength and the tensile elongation were measured. The results are shown in Table 2.

COMPARATIVE EXAMPLES 3 AND 4

The raw materials listed for each comparative example in Table 2 were compounded as described for Examples 7 to 11, except that the screw speed was set at 100 rpm or 200 rpm, and guts were obtained. Also from these samples, pellets and films were manufactured as described for Examples 7 to 11, and they were respectively observed under a microscope, while their infrared absorption peak intensity ratios were obtained. The results are shown in Table 2. The wavelength of concentration fluctuation of the sample obtained in Comparative Example was obtained from an electron microscope photograph. Furthermore, as described for Examples 7 to 11, 50 mm long, 10 mm wide and 0.1 mm thick samples were cut out, and the tensile strength and the tensile elongation of each sample were measured at an inter-chuck distance of 20 mm and at a tensile speed of 10 mm/min. The results are shown in Table 2.

TABLE 2

| | | | Example 7 | Example 8 | Example 9 | Example 10 | Example 11 | Comparative Example 3 | Comparative Example 4 |
|---|---|---|---|---|---|---|---|---|---|
| Chemical composition | PC-1 | parts by weight | 100 | 100 | 100 | 100 | | 100 | 100 |
| | PC-2 | parts by weight | | | | | 100 | | |
| | PBT | parts by weight | 40 | 100 | 100 | 230 | 100 | 100 | 100 |
| | Inactive particles | parts by weight | 1 | | 1 | 1 | 1 | 1 | 1 |
| Kneading conditions | Temperature | °C. | 250 | 250 | 250 | 250 | 250 | 260 | 260 |
| | Screw speed | rpm | 300 | 300 | 300 | 300 | 300 | 100 | 200 |
| Discharged gut | Structure | | Miscible | Miscible | Miscible | Miscible | Miscible | Dispersed | Miscible |
| | Infrared absorption peak intensity ratio 1* | | 0.47 | 0.47 | 0.47 | 0.47 | 0.44 | 0.35 | 0.38 |
| | Wavelength of concentration fluctuation or distance between particles | μm | — | — | — | — | — | 0.2 | — |
| Pellets | Structure | | Miscible | Miscible | Miscible | Co-continuous | Miscible | Dispersed | Miscible |
| | Infrared absorption peak intensity ratio 2* | | 0.48 | 0.47 | 0.47 | 0.47 | 0.44 | 0.35 | 0.39 |
| | Wavelength of concentration fluctuation or distance between particles | μm | — | — | — | 0.07 | — | 1.5 | — |
| Film | Structure | | Co-continuous | Co-continuous | Co-continuous | Co-continuous | Co-continuous | Dispersed | Co-continuous |
| | Infrared absorption peak intensity ratio 4* | | 0.48 | 0.47 | 0.47 | 0.47 | 0.44 | 0.35 | 0.40 |
| | Wavelength of concentration fluctuation or distance between particles | μm | 0.03 | 0.05 | 0.05 | 0.07 | 0.05 | 1.5 | 0.1 |
| | Tensile strength | MPa | 73 | 75 | 74 | 70 | 69 | 55 | 66 |
| | Tensile elongation | % | >300 | >300 | >300 | >300 | 250 | 50 | 200 |

1* I(2933 cm$^{-1}$)/I(2965 cm$^{-1}$)
2* $I_p$(2933 cm − 1)/$I_p$(2965 cm − 1)
4* $I_f$(2933 cm − 1)/$I_f$(2965 cm − 1)

EXAMPLES 12 TO 17

The raw materials including rubbery polymers listed for each example in Table 3 were compounded as described for Examples 1 to 6, and pellets and molded articles were manufactured. They were respectively observed under a transmission electron microscope, and their infrared absorption peak intensity ratios were obtained. The results are shown in Table 3. In all the samples, the guts and pellets had structures in which a rubbery polymer was dispersed in a matrix in which PC and PBT were miscible with each other. On the other hand, the molded articles had structures in which PC and PBT were phase-separated in said matrix. The wavelengths of concentration fluctuation of these structures were obtained using an electron microscope. Furthermore, as described for Examples 1 to 6, molding was evaluated, and Izod impact tests were performed at 23° C. and −40° C. The results are shown in Table 3.

digital variable angle gloss meter (UGV-40 produced by Suga Test Instruments Co., Ltd.) with 45°-45° reflection.

EXAMPLES 18 TO 27

The resins listed as raw materials for each example in the upper section of Table 4 were fed into a double-screw extruder (PCM-30 produced by Ikegai Kogyo) with the screws arranged to have two kneading zones, set at an extrusion temperature of 270° C. and at a screw speed of 300 rpm, and the gut discharged from its die was quickly cooled in icy water. The gut of every example was transparent and observed according to the above-mentioned evaluation methods. It was confirmed that every sample was made miscible without showing structural elements of 0.001 μm or more.

Then, the gut discharged from the die was passed through a cooling bath filled with water kept at 10° C., talking 15

TABLE 3

| | | | Example 12 | Example 13 | Example 14 | Example 15 | Example 16 | Example 17 |
|---|---|---|---|---|---|---|---|---|
| Chemical composition | PC-1 | parts by weight | 100 | 100 | 100 | 100 | 100 | 100 |
| | PBT-2 | parts by weight | 100 | 100 | 100 | 100 | 100 | 100 |
| | Rubbery polymer 1 | parts by weight | 5 | 10 | 10 | 20 | | |
| | Rubbery polymer 2 | parts by weight | | | | | 10 | 20 |
| | Releasing agent 2 | parts by weight | 0.2 | 0.2 | | 0.2 | 0.2 | 0.2 |
| Kneading conditions | Temperature | ° C. | 250 | 250 | 250 | 250 | 250 | 250 |
| | Screw speed | rpm | 300 | 300 | 300 | 300 | 300 | 300 |
| Discharged gut | Structure | | Miscible (PC and PBT) | | | | | |
| | Infrared absorption peak intensity ratio 1* | | 0.48 | 0.49 | 0.49 | 0.49 | 0.48 | 0.48 |
| | Wavelength of concentration fluctuation or distance between particles | μm | — | — | — | — | — | — |
| Pellets | Structure | | Miscible (PC and PBT) | | | | | |
| | Infrared absorption peak intensity ratio 2* | | 0.49 | 0.49 | 0.49 | 0.50 | 0.49 | 0.49 |
| | Wavelength of concentration fluctuation or distance between particles | μm | — | — | — | — | — | — |
| Molded article | Molding method | | Injection molding | Injection molding | Injection molding | Injection molding | Injection molding | Injection molding |
| | Structure | | Co-continuous (PC and PBT) | | | | | |
| | Infrared absorption peak intensity ratio 3* | | 0.58 | 0.59 | 0.59 | 0.59 | 0.58 | 0.58 |
| | Wavelength of concentration fluctuation or distance between particles | μm | 0.08 | 0.10 | 0.10 | 0.09 | 0.09 | 0.08 |
| | Izod impact strength (23° C.) | J/m | 600 | 750 | 755 | 800 | 720 | 790 |
| | Izod impact strength (−40° C.) | J/m | 480 | 520 | 530 | 630 | 500 | 610 |

As described above, it can be seen that the polymer alloys of this invention can be used to obtain injection molded articles with excellent impact resistance and films with excellent mechanical properties.

In the following Examples 18 to 27 and Comparative Examples 5 to 15, the following evaluation methods were used in addition to the above-mentioned phase structure evaluation methods.
(1) Tensile Strength
  Measured according to ASTM D638 (ASTM No. 1 dumbbell).
(2) Bending Test
  Measured according to ASTM D790.
(3) Gloss of Molded Article
  The glossiness of a 100×100×3 mm specimen was measured according to JIS K 7105 Gloss Measurement using a seconds, for being quickly cooled to fix the structure. It was then cut using a strand cutter into pellets.

With the obtained pellets, the corresponding filler shown in the middle section of Table 4 was mixed, and the mixture was fed into a single-screw extruder (Tanabe 40 mm diameter) with a full-flighted screw, set at an extrusion temperature of 270° C. and a screw speed of 100 rpm. The gut discharged from its die was passed through a cooling bath filled with water kept at 10° C., taking 15 minutes, for being quickly cooled to fix the structure, and it was cut using a strand cutter into pellets to be injection-molded.

From the pellets to be injection-molded, a very thin section was cut out, and the state of its structure was observed on its transmission electron microscope photograph as described for the guts. On the electron microscope photogram, a co-continuous structure in which the black dyed polycarbonate phase and the white polybutylene terephthalate phase formed continuous phases respectively or a dispersed structure uniform in the distance between particles was observed. The results are shown in Table 4.

The wavelength of concentration fluctuation of each co-continuous structure and the distance between particles of each dispersed structure were measured according to the above-mentioned evaluation method by means of small-angle X-ray scattering. The results are shown in Table 4.

The pellets were fed into an injection molding machine produced by Nissei Plastic Industrial Co., Ltd. set at 250° C.-260° C.-270° C.-270° C. from below the hopper toward the tip, and ⅛" (3.2 mm) thick ASTM No. 1 dumbbell specimens and ASTM D-790 bending test specimens were obtained by molding at a mold temperature of 80° C. in molding cycles consisting of 10-second dwell time and 30-second cooling time.

The obtained molded articles were evaluated, and the results are shown in Table 4.

Furthermore, for each of the samples having glass fibers mixed, the pellets to be injection-molded were placed in a crucible, and heated in an electric furnace at 500° C. for 30 minutes, for being perfectly incinerated, and subsequently cooled. Then, an adequate amount of a 1% neutral detergent aqueous solution was added, and the mixture was stirred in an ultrasonic washer for 3 minutes. The stirred solution was placed on a special glass sheet using a glass pipette, and photographed using a stereomicroscope. Then, of the photographed fibers, the fiber lengths of 200 fibers were measured using a digitizer, to obtain the fiber length distribution. The results are shown in Table 4.

TABLE 4

| | | | Example 18 | Example 19 | Example 20 | Example 21 | Example 22 |
|---|---|---|---|---|---|---|---|
| Chemical composition (resins as raw materials) | PBT-3 | parts by weight | 70 | 70 | 50 | 50 | 60 |
| | PC-1 | parts by weight | 30 | 30 | 50 | 50 | 50 |
| | PC-2 | parts by weight | | | | | |
| Kneading conditions (double-screw) | Temperature | ° C. | 270 | 270 | 270 | 270 | 270 |
| | Screw speed | rpm | 300 | 300 | 300 | 300 | 300 |
| Discharged gut | | | Miscible | Miscible | Miscible | Miscible | Miscible |
| Filler | Talc 1 | parts by weight | 50 | | 50 | | 25 |
| | Talc 2 | parts by weight | | | | | |
| | Talc 3 | parts by weight | | | | | |
| | Glass fibers | parts by weight | | 50 | | 50 | 25 |
| Kneading conditions (single-screw) | Temperature | ° C. | 270 | 270 | 270 | 270 | 270 |
| | Screw speed | rpm | 100 | 100 | 100 | 100 | 100 |
| Glass fiber length Distribution (pellets) | 0.1~1 mm | wt % | — | 85 | — | 83 | 80 |
| | 0.15~0.7 mm | wt % | — | 80 | — | 78 | 75 |
| Pellets | Structure | | Co-continuous | Co-continuous | Co-continuous | Co-continuous | Co-continuous |
| | Wavelength of concentration fluctuation or distance between particles | μm | 0.1 | 0.1 | 0.1 | 0.1 | 0.1 |
| Injection molded article | Tensile strength | MPa | 152 | 165 | 149 | 161 | 154 |
| | Bending modulus of elasticity | GPa | 9.5 | 10.1 | 9.5 | 10.0 | 9.8 |
| | Gloss of molded article | % | 88 | 85 | 90 | 88 | 89 |

| | | | Example 23 | Example 24 | Example 25 | Example 26 | Example 27 |
|---|---|---|---|---|---|---|---|
| Chemical composition (resins as raw materials) | PBT-3 | parts by weight | 30 | 30 | 50 | 50 | 50 |
| | PC-1 | parts by weight | 70 | 70 | | 50 | |
| | PC-2 | parts by weight | | | 50 | | 50 |
| Kneading conditions (double-screw) | Temperature | ° C. | 270 | 270 | 270 | 270 | 270 |
| | Screw speed | rpm | 300 | 300 | 300 | 300 | 300 |
| Discharged gut | | | Miscible | Miscible | Miscible | Miscible | Miscible |
| Filler | Talc 1 | parts by weight | 50 | | 50 | | |
| | Talc 2 | parts by weight | | | | | |
| | Talc 3 | parts by weight | | | | 50 | |
| | Glass fibers | parts by weight | | 50 | | | 50 |
| Kneading conditions (single-screw) | Temperature | ° C. | 270 | 270 | 270 | 270 | 270 |
| | Screw speed | rpm | 100 | 100 | 100 | 100 | 100 |
| Glass fiber length | 0.1~1 mm | wt % | — | 75 | — | — | 87 |

TABLE 4-continued

| | | | | | | | |
|---|---|---|---|---|---|---|---|
| Distribution (pellets) | 0.15~0.7 mm | wt % | — | 70 | — | — | 83 |
| Pellets | Structure | | Co-continuous | Co-continuous | Co-continuous | Co-continuous | Co-continuous |
| | Wavelength of concentration fluctuation or distance between particles | μm | 0.1 | 0.1 | 0.1 | 0.1 | 0.1 |
| Injection molded article | Tensile strength | MPa | 148 | 160 | 131 | 155 | 140 |
| | Bending modulus of elasticity | GPa | 9.4 | 10.0 | 9.2 | 9.6 | 10.0 |
| | Gloss of molded article | % | 92 | 90 | 89 | 93 | 87 |

COMPARATIVE EXAMPLES 5 TO 12 AND 14

The resins listed as raw materials for each comparative example in the upper section of Table 5 were compounded to obtain a gut as described for Examples 18 to 27, except that the screw speed was 100. The guts of Comparative Examples 5 to 12 and 14 were opaque. These samples were also used to manufacture pellets and injection-molded articles as described for Examples 18 to 27, and they were evaluated as described for Examples 18 to 27. The results are shown in Table 5.

Furthermore, from said pellets to be injection-molded, very thin sections were cut out, and the states of their structures were observed on their transmission electron microscope photographs as described above for the guts. With all the Comparative Examples 5 to 12 and 14, structures in which dispersed particles of 5 μm and more at the largest were heterogeneously dispersed were observed on their electron microscope photographs.

COMPARATIVE EXAMPLE 13

Compounding was performed to obtain a gut as described for Examples 18 to 27, except that the filler used was inorganic particles (talc) not in conformity with this invention in the number average particle size measured by the laser diffraction method. The sample was used to manufacture pellets and an injection-molded article as described for Examples 18 to 27, and they were evaluated as described for Examples 18 to 27. The results are shown in Table 5.

Furthermore, from the pellets to be injection-molded, a very thin section was cut out, and the state of its structure was observed on the transmission electron microscope photograph, as described for the guts in the above. On the electron microscope photograph, a co-continuous structure in which the black dyed polycarbonate phase and the white polybutylene terephthalate phase formed continuous phases respectively was observed.

COMPARATIVE EXAMPLE 15

The resins listed as raw materials in the upper section of Table and the glass fibers listed as a filler in the middle section of Table 5 were simultaneously mixed, and the mixture was fed into a single-screw extruder (Tanabe 40 mm diameter) having a full-flighted screw, set at an extrusion temperature of 270° C. and a screw speed of 100 rpm. The gut discharged from its die was passed in a cooling bath filled with water kept at 10° C., taking 15 seconds, for being quickly cooled to fix the structure, and it was cut using a strand cutter into pellets to be injection-molded. From the pellets to be injection-molded, a very thin section was cut out, and the state of its structure was observed on its transmission electron microscope as described for Examples 18 to 27. On the electron microscope photograph, a structure in which dispersed particles of 5 μm and more at the largest were heterogeneously was observed.

This sample was also used to manufacture an injection-molded article as described for Examples 18 to 27, and it was evaluated as described for Examples 18 to 27. The results are shown in Table 5.

TABLE 5

| | | | Comparative Example 5 | Comparative Example 6 | Comparative Example 7 | Comparative Example 8 | Comparative Example 9 | Comparative Example 10 |
|---|---|---|---|---|---|---|---|---|
| Chemical composition (resins as raw materials) | PBT-3 | parts by weight | 70 | 70 | 50 | 50 | 50 | 30 |
| | PC-1 | parts by weight | 30 | 30 | 50 | 50 | 50 | 70 |
| | PC-2 | parts by weight | | | | | | |
| Kneading conditions (double-screw) | Temperature | ° C. | 270 | 270 | 270 | 270 | 270 | 270 |
| | Screw speed | rpm | 100 | 100 | 100 | 100 | 100 | 100 |
| Discharged gut | | | Immiscible | Immiscible | Immiscible | Immiscible | Immiscible | Immiscible |
| Filler | Talc 1 | parts by Weight | 50 | | 50 | | 25 | 50 |
| | Talc 2 | parts by weight | | | | | | |
| | Glass fibers | parts by weight | | 50 | | 50 | 25 | |
| Kneading conditions (single-screw) | Temperature | ° C. | 270 | 270 | 270 | 270 | 270 | 270 |
| | Screw speed | rpm | 100 | 100 | 100 | 100 | 100 | 100 |
| Glass fiber length Distribution (pellets) | 0.1~1 mm | wt % | — | 83 | — | 80 | 78 | — |
| | 0.15~0.7 mm | wt % | — | 78 | — | 75 | 70 | — |

TABLE 5-continued

| Pellets | Structure | | Dispersed (heterogeneous) | Dispersed (heterogeneous) | Dispersed (heterogeneous) | Dispersed (heterogeneous) | Dispersed (heterogeneous) | Dispersed (heterogeneous) |
|---|---|---|---|---|---|---|---|---|
| | Wavelength of concentration fluctuation or distance between particles | μm | No wavelength of concentration fluctuation | No wavelength of concentration fluctuation | No wavelength of concentration fluctuation | No wavelength of concentration fluctuation | No wavelength of concentration fluctuation | No wavelength of concentration fluctuation |
| Injection molded article | Tensile strength | MPa | 115 | 121 | 113 | 118 | 116 | 112 |
| | Bonding modulus of elasticity | GPa | 9.3 | 9.8 | 9.2 | 9.5 | 9.5 | 9.1 |
| | Gloss of molded article | % | 75 | 73 | 77 | 76 | 77 | 78 |

| | | | Comparative Example 11 | Comparative Example 12 | Comparative Example 13 | Comparative Example 14 | Comparative Example 15 |
|---|---|---|---|---|---|---|---|
| Chemical composition (resins as raw materials) | PBT-3 | parts by weight | 30 | 50 | 50 | 50 | 50 |
| | PC-1 | parts by weight | 70 | | | | 50 |
| | PC-2 | parts by weight | | 50 | 50 | 50 | |
| Kneading conditions (double-screw) | Temperature | ° C. | 270 | 270 | 270 | 270 | |
| | Screw speed | rpm | 100 | 100 | 300 | 100 | |
| Discharged gut | | | Immiscible | Immiscible | Miscible | Immiscible | |
| Filler | Talc 1 | parts by Weight | | | 50 | | |
| | Talc 2 | parts by weight | | | | 50 | |
| | Glass fibers | parts by weight | 50 | | | 50 | 50 |
| Kneading conditions (single-screw) | Temperature | ° C. | 270 | 270 | 270 | 270 | 270 |
| | Screw speed | rpm | 100 | 100 | 100 | 100 | 100 |
| Glass fiber length | 0.1~1 mm | wt % | 70 | — | — | 78 | 55 |
| Distribution (pellets) | 0.15~0.7 mm | wt % | 65 | — | — | 73 | 50 |
| Pellets | Structure | | Dispersed (heterogeneous) | Dispersed (heterogeneous) | Co-continuous | Dispersed (heterogeneous) | Dispersed (heterogeneous) |
| | Wavelength of concentration fluctuation or distance between particles | μm | No wavelength of concentration fluctuation | No wavelength of concentration fluctuation | 0.1 | No wavelength of concentration fluctuation | No wavelength of concentration fluctuation |
| Injection molded article | Tensile strength | MPa | 117 | 98 | 90 | 108 | 93 |
| | Bonding modulus of elasticity | GPa | 9.5 | 9.0 | 8.8 | 9.7 | 9.0 |
| | Gloss of molded article | % | 77 | 77 | 65 | 75 | 68 |

From the results of Examples 18 to 27 and Comparative Examples 5 to 15, it can be seen that the thermoplastic resin compositions of this invention have high strength and high stiffness because of excellent regularity and in addition have excellent weather resistance, and hence can be used to obtain molded articles with excellent surface appearance.

In the following Examples 28 to 31 and Comparative Examples 16 to 18, the following evaluation methods were used in addition to the above-mentioned phase-structure evaluation methods.

(1) Transparency

Obtained sheets were laminated to achieve a thickness of 3.1 mm, and with a 3 mm thick spacer set, the laminate was pressed at 150° C. for 1 minute, to produce a sheet with a thickness of 3 mm. Then, the transmittance of visible light with a wavelength of 400 μm through the sheet was measured using a spectrophotometer MPC3100 produced by Shimadzu Corp.

(2) Transparency after Heat Treatment

Obtained sheets were laminated to achieve a thickness of 3.1 mm, and with a 3 mm thick spacer set, the laminate was pressed at 150° C. for 1 hour, to produce a sheet with a thickness of 3 mm. Then, the transmittance of visible light with a wavelength of 400 μm through the sheet was measured using a spectrophotometer MPC3100 produced by Shimadzu Corp.

(3) Tensile Impact Strength

From an obtained sheet, dumbbell specimens were produced using a punch press and the tensile impact strength was measured according to ASTM D1822.

(4) Chemicals Resistance

An obtained sheet was immersed in tetrahydrofuran for 1 hour. When the sheet did not show any change on its surfaces, it was evaluated as A, and when it showed a change such as roughening, it was evaluated as B.

EXAMPLES 28 TO 31

The raw materials listed for each example in Table 6 were fed into a double-screw extruder (PCM-30 produced by Ikegai Kogyo) with the screws arranged to have two kneading zones, set at an extrusion temperature of 270° C. and a screw speed of 300 rpm, and the gut discharged from its die was quickly cooled in icy water. The gut of every example was transparent, and when observed according to the above-mentioned evaluation method, it was confirmed that every sample was made miscible without structural elements of 0.001 μm or more.

Subsequently the gut discharged from the die was passed through a cooling bath filled with water kept at 10° C., taking 15 seconds, for being quickly cooled to fix the structure, and it was cut using a strand cutter into pellets. The obtained pellets were fed into a single-screw extruder (40 mm diameter) with a T die at the tip portion, set at an extrusion temperature of 250° C., and formed into a sheet. In the formation into a sheet, a specular casting drum of hard chromium kept at 20° C. was installed below the T die. The resin discharged from the mouthpiece of the T die was cast on the casting drum, and furthermore, guided around a second drum kept at 20° C., being passed between rolls set at 5 rpm, to be kept constant in the winding speed, and wound around a winding roll, to obtain a film. All the films obtained had a thickness of 0.1 mm and were transparent. All the samples were observed according to the above-mentioned evaluation method, and it was confirmed a co-continuous structure existed in all the samples. On the electron microscope photograph of each sample, a co-continuous structure in which the black dyed polycarbonate phase and the white polybutylene terephthalate phase formed continuous phases respectively was observed. Furthermore, the wavelength of concentration fluctuation was measured by means of small-angle X-ray scattering. The evaluation results are shown in Table 6.

COMPARATIVE EXAMPLES 16 TO 18

Compounding was performed to obtain guts as described for Examples 28 to 31, except that the screw speed was 100. The guts of Comparative Examples 16 to 18 were opaque. These samples were also used to produce pellets and sheets as described for Examples 28 to 31, and they were evaluated as described for Examples 28 to 31. The results are shown in Table 6.

From the surface of each of the obtained sheets, a very thin section was cut out, and its structure was observed on its transmission electron microscope photograph, as described above for the guts. In each of Comparative Examples 16 to 18, a structure in which dispersed particles of 1 μm and more at the largest were heterogeneously dispersed was observed on the electron microscope photograph.

TABLE 6

|  |  |  | Example 28 | Example 29 | Example 30 | Example 31 | Comparative Example 16 | Comparative Example 17 | Comparative Example 18 |
|---|---|---|---|---|---|---|---|---|---|
| Chemical composition | PBT-3 | parts by weight | 50 | 30 | 50 | 50 | 50 | 30 | 50 |
|  | PC-1 | parts by weight | 50 | 70 |  |  | 50 | 70 |  |
|  | PC-2 | parts by weight |  |  | 50 | 50 |  |  | 50 |
|  | Ultraviolet light absorber | parts by weight |  |  |  | 0.4 |  |  |  |
| Kneading conditions | Temperature | ° C. | 270 | 270 | 270 | 270 | 270 | 270 | 270 |
|  | Screw speed | rpm | 300 | 300 | 300 | 300 | 100 | 100 | 100 |
| Discharged gut Sheet | Structure |  | Miscible Co-continuous | Miscible Co-continuous | Miscible Co-continuous | Miscible Co-continuous | Immiscible Dispersed (heterogeneous) | Immiscible Dispersed (heterogeneous) | Immiscible Dispersed (heterogeneous) |
|  | Wavelength of concentration fluctuation or distance between particles | μm | 0.1 | 0.1 | 0.1 | 0.1 | No wavelength of concentration fluctuation | No wavelength of concentration fluctuation | No wavelength of concentration fluctuation |
| Properties of sheet | Light transmittance | % | 87 | 90 | 86 | 85 | 65 | 77 | 64 |
|  | Light transmittance after heat treatment | % | 82 | 85 | 81 | 83 | 57 | 70 | 55 |
|  | Tensile impact strength | J/m | 200 | 480 | 130 | 125 | 70 | 100 | 50 |
|  | Chemicals resistance |  | A | A | A | A | B | B | B |

From the results of Examples 28 to 31 and Comparative Examples 16 to 18, it can be seen that the molded articles of this invention are excellent in molding properties, chemicals resistance and transparency.

In the following Examples 32 to 34 and Comparative Examples 19 to 21, the following evaluation methods were used in addition to the above-mentioned phase structure evaluation methods.

Under the conditions described later, gas assisted injection molding was performed, and the molding properties were evaluated according to the following criteria.
(1) Uniformity in Wall Thickness
A: The molded article was virtually uniformly filled with gas and had a uniform wall thickness of about 2 mm.
B: The molded article was about 5 mm in the thick wall portion and about 1 mm in the thin wall portion, showing non-uniform portions.
C: The molded article showed some gas leak marks.
(2) Shrink Marks
The number of articles with shrink marks was counted among the molded hollow articles obtained by 50 shots.
(3) Appearance
A: Free from poor appearance due to jetting and granular structure
B: Poor appearance due to jetting
C: Poor appearance due to jetting and granular structure

EXAMPLES 32 TO 34

The raw materials listed for each example in Table 7 were fed into a double-screw extruder (PCM-30 produced by Ikegai Kogyo) with the screws arranged to have two kneading zones, set at an extrusion temperature of 270° C. and a screw speed of 300 rpm, and the gut discharged from its die was quickly cooled in icy water. The gut of every example was transparent and it was observed according to the above-mentioned evaluation method. It was confirmed that every sample was made miscible without structural elements of 0.001 μm or more.

Subsequently, the gut discharged from the die was passed through a cooling bath filled with water kept at 10° C., taking 15 seconds, for being quickly cooled to fix the structure, and it was cut using a strand cutter into pellets.

The obtained pellets were fed into a gas assisted molding machine set at a cylinder temperature of 270° C. and a mold temperature of 80° C., and injection molding was performed with the injected amount of the resins set at about 70% of the mold cavity volume. Two seconds after injection, compressed nitrogen gas with a pressure of 100 kg/cm² was injected into the injected resin mixture from a movable needle arranged in the mold cavity, for swelling the resin mixture, to transfer it to inside the mold cavity. Thereafter, the compression and pressurization by the gas was released, and the molded article was taken out.

The evaluation results on the molding properties of the molded articles obtained as described above are shown in Table 7.

From the surface of the molded article obtained in each example by said gas assisted molding, a very thin section was cut out, and as described above for the guts, the state of its structure was observed on the transmission electron microscope photograph. On the electron microscope photograph, a co-continuous structure in which the black dyed polycarbonate phase and the white polybutylene terephthalate phase formed continuous phases respectively or a dispersed structure uniform in the distance between particles was observed.

The wavelength of concentration fluctuation in the co-continuous structure or the distance between particles in the dispersed structure was measured by means of small-angle X-ray scattering. The results are shown in Table 7.

COMPARATIVE EXAMPLES 19 TO 21

The raw materials listed for each comparative example in Table 7 were compounded to obtain a gut as described for Examples 32 to 34, except that the screw speed was 100. All the guts of Comparative Examples 19 to 21 were opaque. These samples were also used to produce pellets and molded hollow articles as described for Examples 32 to 34, and they were evaluated as described for Examples 32 to 34. The results are shown in Table 7.

From the surface of the molded article obtained by said gas assisted molding in each comparative example, a very thin section was cut out, and the state of its structure was observed on its transmission electron microscope photograph, as described above for the guts. In each of Comparative Examples 19 to 21, a structure in which dispersed particles of 5 μm and more at the largest were heterogeneously dispersed was observed on the electron microscope photograph.

TABLE 7

| | | | Example 32 | Example 33 | Example 34 | Comparative Example 19 | Comparative Example 20 | Comparative Example 21 |
|---|---|---|---|---|---|---|---|---|
| Chemical composition | PBT-3 | parts by weight | 70 | 50 | 30 | 70 | 50 | 30 |
| | PC-1 | parts by weight | 30 | 50 | 70 | 30 | 50 | 70 |
| Kneading conditions | Temperature | ° C. | 270 | 270 | 270 | 270 | 270 | 270 |
| | Screw speed | rpm | 300 | 300 | 300 | 100 | 100 | 100 |
| Discharged gut | | | Miscible | Miscible | Miscible | Immiscible | Immiscible | Immiscible |
| Molded article | Molding method | | Gas assisted molding | | | Gas assisted molding | | |
| | Structure | | Dispersed | Co-continuous | Co-continuous | Dispersed (heterogeneous) | Dispersed (heterogeneous) | Dispersed (heterogeneous) |
| | Wavelength of concentration fluctuation or distance between particles | μm | 0.08 | 0.1 | 0.1 | No wavelength of concentration fluctuation | No wavelength of concentration fluctuation | No wavelength of concentration fluctuation |
| Molding properties | Uniformity in wall thickness | Number | A | A | A | B | C | C |
| | Shrink marks | of marks | 0 | 0 | 0 | 5 | 9 | 13 |
| | Appearances | | A | A | A | C | B | B |

From the results of Examples 32 to 34 and Comparative Examples 19 to 21, it can be seen that since molded hollow articles uniform in wall thickness can be obtained according to this invention, they can be valuably used as molded articles with hollow portions because of the property.

In the following Examples 35 to 37 and Comparative Examples 22 to 24, the following evaluation methods were used in addition to the above-mentioned phase structure evaluation methods.

Under the following conditions, laser welding was performed for evaluation according to the following criteria.

(1) Weldability

A: The surface on which the laser beam fell was free from melt marks, and the molded article could be welded.

B: The surface on which the laser beam fell showed melt marks, but the molded article could be welded.

C: The surface on which the laser beam fell showed melt marks, and the molded article could not be welded.

(2) Weld Strength

A tensile testing machine (AG-500B) was used to perform a tensile test at a tensile speed of 1 mm/min with a span of 40 mm to ensure that a tensile shear stress acted on the weld zone, and the stress at the time when the weld zone was fractured was obtained.

EXAMPLES 35 TO 37

The raw materials listed for each example in Table 8 were fed into a two-screw extruder (PCM-30 produced by Ikegai Kogyo) with the screws arranged to have two kneading zones, set at an extrusion temperature of 270° C. and a screw speed of 300 rpm, and the gut discharged from its die was quickly cooled in icy water. The gut of every example was transparent, and when it was observed according to the above-mentioned evaluation method, it was confirmed that every sample was made miscible without structural elements of 0.001 μm or more.

Subsequently, the gut discharged from the die was passed through a cooling bath filled with water kept at 10° C., taking 15 seconds, for being quickly cooled to fix the structure, and it was cut using a strand cutter into pellets.

The obtained pellets were fed into an injection molding machine set at a cylinder temperature of 270° C. and a mold temperature of 80° C. and molded into a 24 mm wide, 70 mm long and 3 mm thick specimen for the laser beam transmission side. Furthermore, a material obtained by mixing 0.4 part by weight of carbon black with 100 parts by weight of polybutylene terephthalate resin was used to similarly produce a specimen for the laser beam absorption side. The two specimens were overlapped on each other to have 30 mm long portions overlaid on each other with the specimen for the laser beam transmission side above. The overlaid region was irradiated with a laser beam from above at an output of 20 W, a laser scanning speed of 10 mm/sec, a focal distance of 38 mm and a focal distance of 0.6 mm, for laser welding.

The evaluation results on the molding properties of the obtained molded composite articles are shown in Table 8.

Furthermore, from the surface of the non-weld zone of the laser-welded molded article in each example, a very thin section was cut out, and the state of its structure was observed on its transmission electron microscope photograph, as described above for the guts. On the electron microscope photograph, a co-continuous structure in which the black dyed polycarbonate phase and the white polybutylene terephthalate phase formed continuous phases respectively or a dispersed structure uniform in the distance between particles was observed.

Moreover, the wavelength concentration fluctuation in the co-continuous structure or the distance between particles in the dispersed structure was measured by means of small-angle X-ray scattering. The results are shown in Table 8.

COMPARATIVE EXAMPLES 22 TO 24

The raw materials listed for each comparative example in Table 8 were melt-kneaded to obtain a gut as described for Examples 35 to 37, except that the screw speed was 100. All the guts of Comparative Examples 22 to 24 were opaque. These samples were also used to produce pellets and laser-welded molded composite articles as described for Examples 35 to 37, and their molding properties were evaluated as described for Examples 35 to 37. The results are shown in Table 8.

Furthermore, from the surface of the non-weld zone of the laser-welded molded article of each comparative example, a very thin section was cut out, and the state of its structure was observed on its electron microscope photograph, as described above for the guts. In each of Comparative Examples 22 to 24, a structure in which dispersed particles of 5 μm and more at the largest were heterogeneously dispersed was observed on the electron microscope photograph.

TABLE 8

| | | | Example 35 | Example 36 | Example 37 | Comparative Example 22 | Comparative Example 23 | Comparative Example 24 |
|---|---|---|---|---|---|---|---|---|
| Chemical composition | PBT-3 | parts by weight | 70 | 50 | 30 | 70 | 50 | 30 |
| | PC-1 | parts by weight | 30 | 50 | 70 | 30 | 50 | 70 |
| Kneading conditions | Temperature | ° C. | 270 | 270 | 270 | 270 | 270 | 270 |
| | Screw speed | rpm | 300 | 300 | 300 | 100 | 100 | 100 |
| Discharged gut | | | Miscible | Miscible | Miscible | Immiscible | Immiscible | Immiscible |
| Molded article | Welding method | | | Laser welding | | | Laser welding | |
| | Structure | | Dispersed | Co-continuous | Co-continuous | Dispersed (heterogeneous) | Dispersed (heterogeneous) | Dispersed (heterogeneous) |
| | Wavelength of concentration fluctuation or distance between particles | μm | 0.08 | 0.1 | 0.1 | No wavelength of concentration fluctuation | No wavelength of concentration fluctuation | No wavelength of concentration fluctuation |
| Welding properties | Weldability | | A | A | A | C | B | B |
| | Welding strength | MPa | 45 | 50 | 53 | — | 25 | 30 |

From the results of Examples 35 to 38 and Comparative Examples 22 to 24, since molded composite articles excellent in weld strength can be obtained according to this invention, they can be valuably used as molded composite articles with weld zones because of the property.

The polymer alloy as the first version of this invention can be used to obtain injection-molded articles very excellent in impact resistance and films excellent in mechanical properties. So, it can be valuably used as a material having these properties. Furthermore, the polymer alloy obtained according to this version of the invention can be valuably used, for example, for automobile parts and electric machine parts, since it is excellent in impact resistance and mechanical properties.

The thermoplastic resin composition as the second version of the invention has excellent weather resistance in addition to the high strength and high stiffness attributable to excellent regularity. So, it can be used to obtain molded articles with excellent surface appearance. Therefore, because of these properties, it can be widely used for automobile parts, electric parts, etc. Above all, it can be valuably used for automobile parts.

The molded article as the third version of this invention is excellent in molding properties, chemicals resistance and transparency. Because of these properties, it can be valuably used for applications relating to foods, packaging materials, medical products, agriculture, building materials, electric and electronic parts, information industry and optical industry.

The molded article as the fourth version of the invention is a molded hollow article with a uniform wall thickness. Because of this property, it can be widely used as a molded article with a hollow portion for automobile parts, electric parts, etc. Above all, it can be valuably used for automobile parts.

The molded article as the fifth version of the invention is a molded composite article with excellent weld strength. Because of this property, it can be widely used as a molded composite article having a weld zone for automobile parts, electric parts, etc. Above all, it can be valuably used for automobile parts.

The invention claimed is:

1. A thermoplastic resin composition comprising a polymer alloy, in which at least polybutylene terephthalate resin and a polycarbonate resin are mixed, and a filler, wherein said filler is the following inorganic particles (a) and/or glass fibers (b), and said polymer alloy forms a co-continuous structure with a wavelength of concentration fluctuation of 0.001 to 5 pm or a dispersed structure with a distance between particles of 0.001 to 5 pm;
   (a) inorganic particles with a number average particle size of 10 μm or less, as measured by the laser diffraction method;
   (b) glass fibers, not less than 60 wt % of which in the thermoplastic resin composition have their fiber lengths kept in a range from 0.1 to 1 mm;
      wherein in the case where the infrared absorption spectrum of the polymer alloy is measured, the intensity ratio of the absorption peak appearing in a range of $2933\pm5$ $cm^{-1}$ to the absorption peak appearing in a range of $2965\pm5$ $cm^{-1}$ is 0.43 or more.

2. A thermoplastic resin composition, according to claim 1, wherein said inorganic particles are at least one kind selected from talc, kaolin, mica and calcium carbonate.

3. A thermoplastic resin composition, according to claim 1, wherein the polycarbonate resin as an component of said polymer alloy has a specific viscosity of 0.8 or more when the solution obtained by dissolving 0.7 g of the polycarbonate resin in 100 ml of methylene chloride is measured at 20° C.

4. A molded transparent article comprising a polymer alloy, in which at least polybutylene terephthalate resin and a polycarbonate resin are mixed, wherein said polymer alloy forms a co-continuous structure with a wavelength of concentration fluctuation of 0.001 μm to less than 0.4 μm or a dispersed structure with a distance between particles of 0.001 μm to less than 4 μm on the surface of said molded article, and a 3 mm thick specimen obtained from said molded transparent article and heat-treated at 150° C. for 1 hour has a light transmittance of 80% or more in the visible light with a wavelength of 400 nm; wherein in the case where the infrared absorption spectrum of the polymer alloy is measured, the intensity ratio of the absorption peak appearing in a range of $2933\pm5$ $cm^{-1}$ to the absorption peak appearing in a range of $2965\pm5$ $cm^-$ is 0.43 or more.

5. A molded article, according to claim 4, which further contains an ultraviolet light absorber.

6. A molded article, according to claim 4, which is selected from an injection-molded article, a film or a sheet, or a molded article obtained by processing the film or sheet.

7. A molded article with a hollow portion manufactured by molding a polymer alloy, in which at least polybutylene terephthalate resin and a polycarbonate resin are mixed, wherein the polymer alloy constituting said molded article forms a co-continuous structure with a wavelength of concentration fluctuation of 0.001 to 5 μm or a dispersed structure with a distance between particles of 0.001 to 5 μm on the surface of the molded article; wherein in the case where the infrared absorption spectrum of the polymer alloy is measured, the intensity ratio of the absorption peak appearing in a range of $2933\pm5$ $cm^{-1}$ to the absorption peak appearing in a range of $2965\pm5$ $cm^{-1}$ is 0.43 or more.

8. A molded article, according to claim 7, which is manufactured by a molding method selected from a gas assisted molding method and an injection blow molding method.

9. A molded article with a weld zone in which a molded article manufactured by molding a polymer alloy, in which at least polybutylene terephthalate resin and a polycarbonate resin are mixed, is welded to another member, wherein said polymer alloy forms a co-continuous structure with a wavelength of concentration fluctuation of 0.001 to 5 μm or a dispersed structure with a distance between particles of 0.001 to 5 μm on the surface of the non-weld zone comprising said polymer alloy in said molded article; wherein in the case where the infrared absorption spectrum of the polymer alloy is measured, the intensity ratio of the absorption peak appearing in a range of $2933\pm5$ $cm^{-1}$ to the absorption peak appearing in a range of $2965\pm5$ $cm^{-1}$ is 0.43 or more.

10. A molded article, according to claim 9, wherein said weld zone is obtained by a welding method selected from a laser welding method, vibration welding, method, thermal welding method and ultrasonic welding method.

* * * * *